United States Patent
Hakata et al.

(10) Patent No.: US 11,398,224 B2
(45) Date of Patent: Jul. 26, 2022

(54) COMMUNICATION SYSTEM AND METHOD FOR PROVIDING ADVICE TO IMPROVE A SPEAKING STYLE

(71) Applicant: Ricoh Company, Ltd., Tokyo (JP)

(72) Inventors: Mayu Hakata, Kanagawa (JP); Takashi Hasegawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 17/023,630

(22) Filed: Sep. 17, 2020

(65) Prior Publication Data

US 2021/0125602 A1   Apr. 29, 2021

(30) Foreign Application Priority Data

Oct. 28, 2019  (JP) .............................. JP2019-195630

(51) Int. Cl.
| | |
|---|---|
| *G10L 15/22* | (2006.01) |
| *G10L 15/10* | (2006.01) |
| *G10L 15/25* | (2013.01) |
| *G10L 15/08* | (2006.01) |

(52) U.S. Cl.
CPC ............ *G10L 15/10* (2013.01); *G10L 15/083* (2013.01); *G10L 15/25* (2013.01)

(58) Field of Classification Search
CPC ....... G10L 15/10; G10L 15/083; G10L 15/22; G10L 15/25; G10L 25/60; G10L 2015/225
USPC ........................................................ 704/231
See application file for complete search history.

(56) References Cited

U.S. PATENT DOCUMENTS

| | | | | |
|---|---|---|---|---|
| 9,679,495 | B2 * | 6/2017 | Cohen | G09B 7/00 |
| 10,237,310 | B2 * | 3/2019 | Hayano | H04L 12/1822 |
| 10,534,623 | B2 * | 1/2020 | Harper | G06Q 30/0277 |
| 10,536,668 | B2 * | 1/2020 | Soneda | H04N 7/15 |
| 10,686,848 | B2 * | 6/2020 | Ohmura | H04N 7/147 |
| 10,757,148 | B2 * | 8/2020 | Nelson | H04M 7/0027 |
| 10,764,513 | B2 * | 9/2020 | Ohmura | H04N 5/272 |
| 10,944,798 | B2 * | 3/2021 | Ohmura | H04N 7/15 |
| 2018/0167580 | A1 | 6/2018 | Hasegawa | |
| 2018/0324228 | A1 | 11/2018 | Hasegawa et al. | |
| 2018/0367758 | A1 | 12/2018 | Shiro et al. | |

(Continued)

FOREIGN PATENT DOCUMENTS

| | | |
|---|---|---|
| JP | 2016-103081 | 6/2016 |
| JP | 2019-197361 | 11/2019 |
| JP | 2020-088489 | 6/2020 |

*Primary Examiner* — Susan I McFadden
(74) *Attorney, Agent, or Firm* — Xsensus LLP

(57) ABSTRACT

A communication system includes a first terminal device, a second terminal device, and an advice providing device. The first terminal device is operated by an operator. The second terminal device is operated by a guest. The second terminal device communicates with the first terminal device through a network. The advice providing device includes circuitry that determines advice for the operator based on voice data including first voice data that is related to the operator and transmitted from the first terminal device and second voice data that is related to the guest and transmitted from the second terminal device. The circuitry of the advice providing device further transmits the advice to the first terminal device. The first terminal device receives the advice and displays, on a display, the advice.

11 Claims, 26 Drawing Sheets

(56) References Cited

U.S. PATENT DOCUMENTS

2020/0067992 A1 2/2020 Terayama et al.
2020/0162617 A1 5/2020 Hasegawa

* cited by examiner

FIG. 7A

| COMMUNICA-TION ID | PRESENCE STATUS | ATTRIBUTE INFORMATION |
|---|---|---|
| O01 | chat | hd, th, ks |
| O02 | online | hd, cb, kk, sk |
| O03 | online | hd, kt, cb |

FIG. 7B

| ATTRIBUTE | PRESENCE STATUS | COMMUNICATION ID BEING ONLINE | COMMUNICATION ID BEING BUSY |
|---|---|---|---|
| hd | online | O02, O03 | |
| th | offline | | |
| kt | online | O03 | |
| cb | online | O02, O03 | |
| kk | online | O02 | |
| ss | offline | | |
| sk | online | O02 | |
| ks | offline | | |

FIG. 7C

| DESTINATION OF CALL START REQUEST: COMMUNICATION ID |
|---|
| O02 |
| O03 |
| ... |

FIG. 7D

| COMMUNICA-TION ID | PASSWORD |
|---|---|
| C01 | aaaa |
| ... | ... |
| O01 | abab |
| ... | ... |

FIG. 7E

| COMMUNICA-TION ID | IP ADDRESS |
|---|---|
| C01 | 1.2.1.3 |
| ... | ... |
| O01 | 1.3.2.3 |
| ... | ... |

FIG. 9A

| WORD | PART OF SPEECH | VOICE VOLUME | TONE | FACIAL EXPRESSION |
|---|---|---|---|---|
| I | PRONOUN | MEDIUM | HIGH | NORMAL |
| WANT | VERB | LOUD | HIGH | NORMAL |
| TO | PREPOSITION (INFINITIVE) | SOFT | LOW | SMILE |
| GO | VERB | LOUD | HIGH | SMILE |
| TO | PREPOSITION | SOFT | HIGH | SMILE |
| A | ARTICLE | SOFT | LOW | SMILE |
| BEACH | NOUN | LOUD | HIGH | SMILE |
| NEXT | ADJECTIVE | LOUD | HIGH | SMILE |
| TIME | NOUN | MEDIUM | HIGH | SMILE |
| ... | ... | ... | ... | ... |

FIG. 9B

| CALL ID | THE NUMBER OF REPEATING TIMES |
|---|---|
| 001a | 20 |
| 002a | 30 |
| ... | ... |

FIG. 9C

| CALL ID | STORE | OPERATOR |
|---|---|---|
| 001a | 20 | 10 |
| 002a | 30 | 3 |
| ... | ... | ... |

FIG. 9D

| ADVICE ID | THE NUMBER OF REPEATING TIMES | ADVICE | DISPLAY METHOD |
|---|---|---|---|
| 001b | 20 | Speak up a little bit | TEXT IN RED |
| 002b | 60 | Speak louder | TEXT IN BOLD |
| ... | ... | ... | ... |

FIG. 9E

| ADVICE ID | SPEED DIFFERENCE | ADVICE ID | DISPLAY METHOD |
|---|---|---|---|
| 001c | −10 | Speak a little bit slower | TEXT IN RED |
| 002c | +10 | Speak a little bit faster | TEXT IN BOLD |
| ... | ... | ... | ... |

FIG. 9F

| DESTINATION | AVERAGE TIME | ADVICE | DISPLAY METHOD |
|---|---|---|---|
| DOMESTIC | 40 | Wrap up this session soon | TEXT IN RED |
| OVERSEAS | 70 | Wrap up this session soon | TEXT IN RED |
| ... | ... | ... | ... |

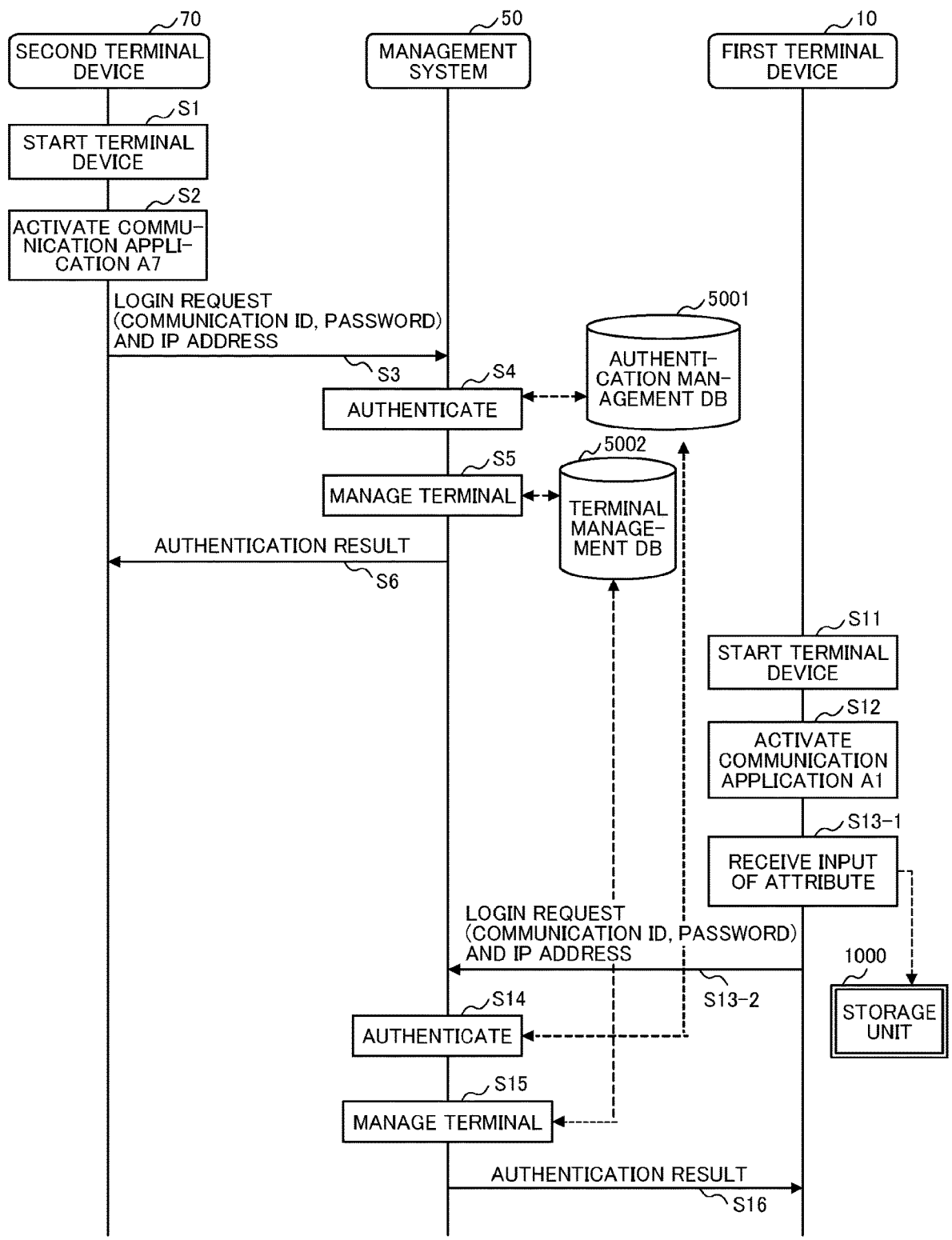

COMMUNICATION SYSTEM AND METHOD FOR PROVIDING ADVICE TO IMPROVE A SPEAKING STYLE

CROSS-REFERENCE TO RELATED APPLICATION

This patent application is based on and claims priority pursuant to 35 U.S.C. § 119(a) to Japanese Patent Application No. 2019-195630, filed on Oct. 28, 2019, in the Japan Patent Office, the entire disclosure of which is hereby incorporated by reference herein.

BACKGROUND

Technical Field

Embodiments of the present disclosure relate to a communication system, a communication method, and a recording medium storing a program for executing a communication method.

Related Art

There are wireless communication systems in which terminal devices at remote sites perform remote communications, such as a conference among users at the remote sites, by transmitting and receiving images and sounds to and from each other to display the images on displays and output the sounds from speakers. Each terminal device includes a camera, a microphone, a display, and a speaker. An image captured by the camera of one of the terminal devices is displayed on the display of another one or more of the terminal devices, which is/are (a) counterpart communication terminal(s). In addition, voice acquired by the microphone of one of the terminal devices is output from the speaker of another one or more of the terminal devices, which is/are (a) counterpart communication terminal(s). Such a communication system allows an operator at a call center to talk on a call (for example, serve a guest or customer) while seeing a face of the guest who has visited a store. In addition, such a communication system also allows the guest to hear an explanation while seeing a face of the operator.

A technique for assisting a conversation is also known. In such a technique, a conversation analysis device analyzes a conversation in real time, analyzes receptivity of a conversation partner of a user and conversation skills of the user, and then extracts a user (influencer) having a large influence on a certain topic on another person.

SUMMARY

An exemplary embodiment of the present disclosure includes a communication system including a first terminal device, a second terminal device, and an advice providing device that includes circuitry. The first terminal device is operated by an operator. The second terminal device is operated by a guest. The second terminal device communicates with the first terminal device through a network. The circuitry of the advice providing device determines advice for the operator based on voice data including first voice data that is related to the operator and transmitted from the first terminal device and second voice data that is related to the guest and transmitted from the second terminal device. The circuitry of the advice providing device further transmits the advice to the first terminal device. The first terminal device receives the advice and displays, on a display, the advice.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 7A is a conceptual diagram illustrating an example of a counterpart management table stored in a counterpart management database (DB), according to an embodiment;

FIG. 7B is a conceptual diagram illustrating an example of a presence status management table stored in a presence status management DB, according to an embodiment;

FIG. 7C is a conceptual diagram illustrating a destination management table stored in a destination management DB, according to an embodiment;

FIG. 7D is a conceptual diagram illustrating an authentication management table stored in an authentication management DB, according to an embodiment;

FIG. 7E is a conceptual diagram illustrating a terminal management table stored in a terminal management DB, according to an embodiment;

FIG. 9A to FIG. 9F are conceptual diagrams illustrating information stored in storage units, according to an embodiment;

FIG. 10 is a sequence diagram illustrating an example of a process of logging in a management system performed by a terminal device, according to an embodiment;

Figure 1A:
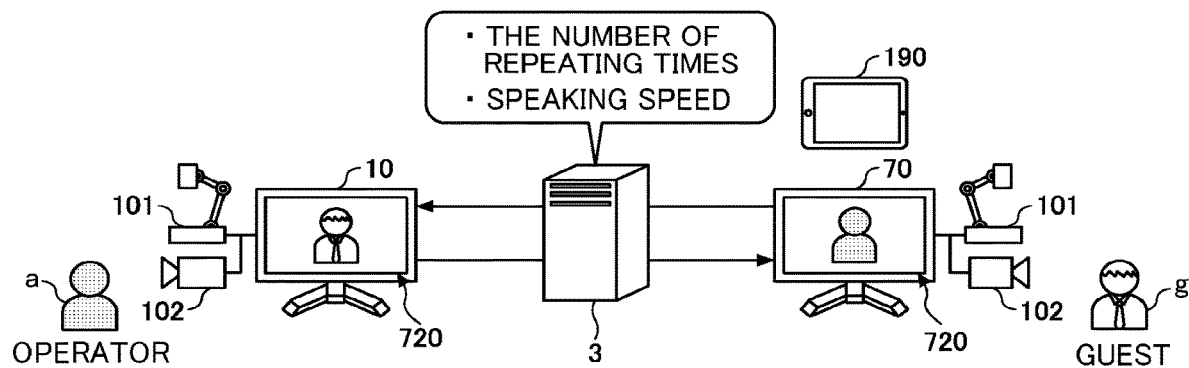
FIG. 1A is a diagram illustrating an outline of a communication system that provides advice on improving work efficiency in customer service, according to an embodiment.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Overall Operation:

FIG. 1A is a diagram illustrating an outline of a communication system 100 that provides, or offers, advice on improving work efficiency in customer service, according to an embodiment. In FIG. 1A, a remote communication is performed between two terminal devices, which are a first terminal device 10 and a second terminal device 70. The remote communication is a meeting, which is an online meeting, accessible from remote locations, or sites. The meeting means a gathering of people for consultation, discussion, or the like. Examples of the meeting include, but not limited to, serving a customer, a meeting, a conference, a gathering, an assembly, a study session, a class, a seminar, and a presentation. The remote communication is not necessarily be bidirectional communication.

For example, the first terminal device 10 is placed in a call center and the second terminal device 70 is placed in a store. In the example of FIG. 1A, an operator a operates the first terminal device 10, and a guest (customer) g visiting a store operates the second terminal device 70. A web camera 101 and an overhead camera 102 are connected to each of the first terminal device 10 and the second terminal device 70. In addition, the second terminal device 70 is connected to a touch panel 190 that allows the guest g to input information by hand.

1)

As illustrated in FIG. 1A, the first terminal device 10 displays, on a display 720, an image captured by the web camera 101 or the overhead camera 102 of the second terminal device 70 during the communication (providing online customer service). The image may be a video image or a still image. Similarly, the second terminal device 70 displays, on the display 720, an image, which may be a video image or a still image, captured by the web camera 101 or the overhead camera 102 of the first terminal device 10. This allows the operator a and the guest g to talk while seeing their faces each other.

2)

During an online call (communication) performed through a network, a management system 50 detects how many times (the number of times) the guest asked the operator to repeat what the operator has said, or a speaking speed of at least the operator. Hereinafter, an online call is simply referred to as a call. In general, a guest asks an operator to repeat what the operator has just said, when it is difficult for the guest to hear or catch what he or she said (to distinguish words spoken by the operator). If the operator speaks in a soft voice, the guest may have difficulty in hearing what the operator said. In addition, if the operator speaks in high speed, the guest may have difficulty in hearing what the operator said. To cope with the above-described cases, an advice providing device 3 provides the operator with advice on improving a speaking style of the operator, when either of the number of times that the guest asked the operator to repeat what the operator said or a speaking speed of the operator exceeds a threshold value.

3)

Figure 1B:
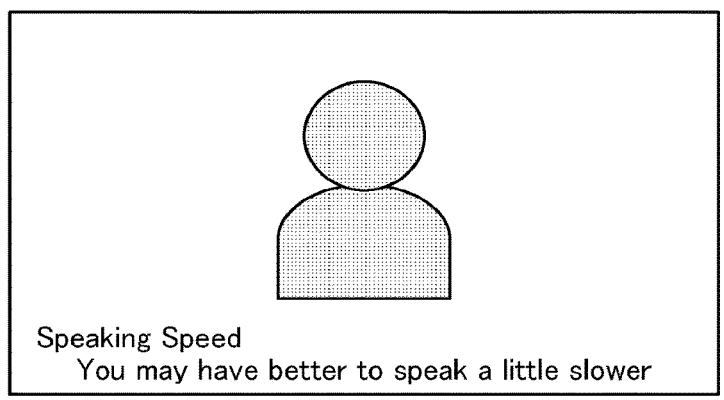
FIG. 1B is a diagram illustrating an example of a display displaying a piece of advice on improving serving a guest, according to an embodiment.

FIG. 1B is an example of a display of the first terminal device 10 used by an operator, displaying a piece of advice on improving serving a guest, according to an embodiment. In the example of FIG. 1B, "Speaking Speed: You may have better to speak a little slower" is displayed. This allows the operator to slow down his or her speaking speed and continue talking with the guest.

As described above, the communication system 100 according to the present embodiment provides advice, which is a concrete method for improving serving a guest, in real time based on an analysis result obtained by analyzing voice data, resulting in improving work efficiency in such as the customer service.

Words Used in Disclosure:

"Providing advice" is defined as offering or giving advice or a tip, that is offered or given. In the present embodiment, "advice" may be any types of information as long as the information is related to improving work efficiency. For example, such information is used to shorten an average time required for serving a guest or a customer. The advice may be output by voice sound to a headset, or may be provided by an alarm sound, in addition to, or in alternative to being displayed.

Figure 2:
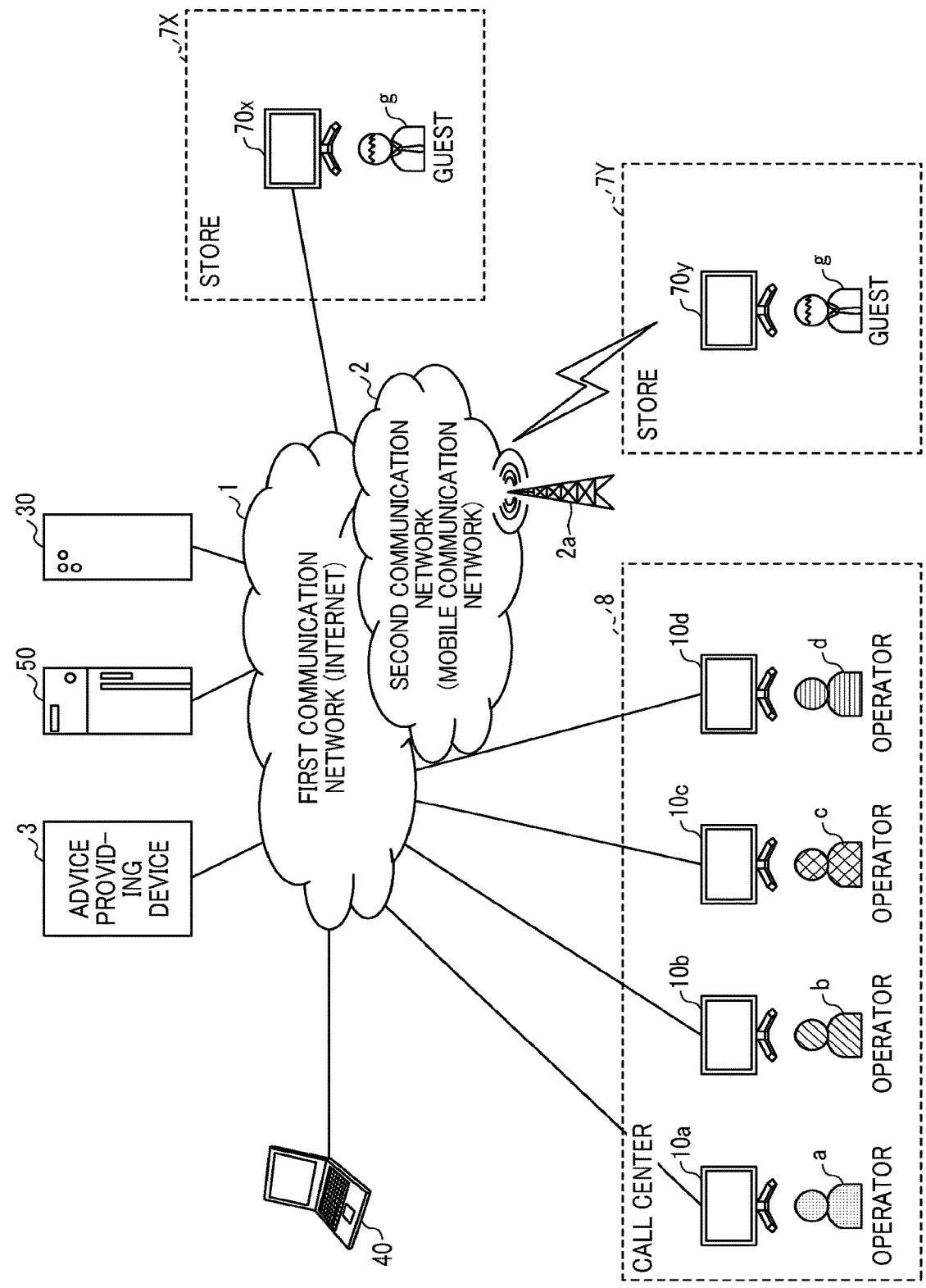
FIG. 2 is a schematic diagram illustrating a configuration of a communication system, according to an embodiment.

System Configuration:

FIG. 2 is a schematic diagram illustrating a configuration of the communication system 100 according to the present embodiment. Referring to FIG. 2, the communication system 100 according to the present embodiment includes a plurality of terminal devices, which are the first terminal device 10 and the second terminal device 70, set at each location or site, one or more relay devices 30, one or more management systems 50, and the advice providing device 3. In the disclosure, "site" is defined as a place or an area where an operation base is. In the disclosure, "site" is replaceable with "location". "Site" is where the first terminal device 10 or the second terminal device 70 is set or where a user is. Referring to FIG. 2, there are three sites, which are a call center 8, a store 7X, and another store 7Y.

The call center 8 is provided with first terminal devices 10a to 10d, the store 7X is provided with a second terminal device 70x, and the store 7Y is provided with a second terminal device 70y. The numbers of sites or devices are not limited to the numbers illustrated in FIG. 2 or described in the embodiment. In addition, in the disclosure, an arbitrary one or ones of the plurality of second terminal devices 70x and 70y is/are represented as a "second terminal device(s) 70", and an arbitrary one or ones of the plurality of first terminal devices 10a to 10d is/are represented as a "first terminal device(s) 10". An arbitrary one or ones of the plurality of stores 7x and 7y is/are represented as a "store(s) 7".

The call center 8 is a department that handles inquiries from guests. A person who deal with the inquiries at the call center 8 is referred to as an operator in the embodiment. The operator may be alternatively referred to as a concierge, a guide, an instructor, an advisor, or the like. The store 7 is a facility or a place for business. There are real products or catalogs of services in the store 7, which guests may visit. Examples of the store 7 includes, but not limited to, a travel agency, a bank, a clinic, and the like. The store 7 may be any types of facility where the user may visit. The guest who visits the store 7 operates the second terminal device 70, which is set in the store 7 in advance, to start a video conference (video call) with the first terminal device 10, which is set in the call center 8. By doing so, the number of staffs in the store 7 may be minimized, or the guest in each location may have a video conference with a highly specialized staff.

Although the first terminal device 10, which is for the operator, is set in the call center 8 in FIG. 2, the first terminal device 10 for the operator also may be set in the store 7. This is because, for example, when there is no customer or guest in the store 7, the staff working at the store 7 may use the first terminal device 10 as an operator. As described below, the first terminal device 10 and the second terminal device 70 may be general information processing devices. The general information processing device may switch application software (application software for video conference) between an operator use and a guest use.

The first terminal device 10 and the second terminal device 70 may be the general information processing devices such as personal computers (PCs). Each of the first terminal device 10 and the second terminal device 70 may be a dedicated terminal. Application software for operator is installed on the first terminal device 10, and application software for guest is installed on the second terminal device 70. Depending on application software installed, attribute information of each of the first terminal device 10 and the second terminal device 70 is determined. As described above, the attribute information may be determined by the application software, or the attribute information may be determined by a communication identification (ID) described later, alternatively. In the case of using a communication ID, each of the first terminal device 10 and the second terminal device 70 may use a table in which attribute information is associated with the communication ID.

The first terminal devices 10 and the second terminal device 70, each of which is a general information processing device, may execute software other than the application software for video conference, for example such as software for a presentation or a browser. In addition to a PC, the examples of each of the first terminal device 10 and the second terminal device 70 include, but not limited to, a tablet terminal, a smartphone, a personal digital assistant (PDA), and the like. Such terminal devices may be any terminal devices as long as the application software is executable. For example, such terminal devices also include a car navigation device, a television receiver, a digital signage terminal, an electronic whiteboard, a projector, and the like. In addition, the first terminal device 10 and the second terminal device 70 are not necessarily the same type of information processing devices.

In addition, dedicated terminal devices dedicated to video conferences may be used as the first terminal device 10 and the second terminal device 70. As one example, there is a dedicated terminal device that logs in to the management system 50 and transmits or receives video image (moving image) and voice sound (audio) by turning on the power.

The communication system 100 according to the present embodiment is described as being used for a video conference. However, the communication system 100 is also applied to a communication system or a data communication system. The communication system 100 also includes a data providing system that transmits image data or voice data (audio data) in one direction from one of the first terminal devices 10 to the other ones of the first terminal devices 10 via a server. In addition, the video conference may be referred to as a video call (communication), a teleconference, or a videoconference. In addition, a video conference may be referred to as a remote conference, a remote consultation, remote consulting, or the like. Three or more of the second terminal devices 70 may communicate at the same time.

The first terminal device 10, the management system 50, and the relay device 30 are connected to a first communication network 1 or a second communication network 2 for communication. The first communication network 1 may be a general network, such as, for example, a local area network (LAN), a Wireless Fidelity (Wi-Fi), or the Internet. For example, the first communication network 1 may include a dedicated line such as a wide area Ethernet (registered trademark) and a Virtual Private Network (VPN). When using wireless communications, the terminal device connects to the second communication network 2 (mobile communication network) using a base station 2a as an access point. The second communication network 2 includes sites where the wireless communications, such as third generation (3G), fourth generation (4G), Long Term Evolution (LTE), fifth generation (5G) or Bluetooth (Registered Trademark), is used. The first communication network 1 and the second communication network 2 are connected to each other by a gateway.

In the communication system 100 according to the present embodiment, the plurality of first terminal devices 10 and the plurality of second terminal devices 70 transmits or receives, for example, image data and voice data via the relay device 30. The image data includes, or represents, a still image or a video (moving) image. Hereinafter, the image data may be referred to as video data in the disclosure. When transmitting or receiving the image data and the voice data (audio data), a management information session for transmitting or receiving various types of management information is established among the plurality of first terminal devices 10 and the plurality of second terminal devices 70 via the management system 50. In addition, a data session for transmitting or receiving the image data and the voice data is established among the plurality of first terminal devices 10 and the plurality of second terminal devices 70 via the relay device 30. In particular, the image data transmitted or received in the data session is encoded data that is encoded in a scalable manner, and for example, each of encoded data of high quality video, encoded data of medium quality video, and encoded data of low quality video is transmitted or received through a corresponding channel.

As a function of the video conference, each of the first terminal device 10 and the second terminal device 70 transmits image data captured by a camera (image capturing device), voice data collected by a microphone, or material data used for explanation to the other ones of the first terminal devices 10 and the second terminal devices 70, each of which is located in other site and participating in the video conference via the relay device 30. In addition, handwritten information may be transmitted to other ones of the first terminal devices 10 and the second terminal devices 70, which are set in other sites. In addition, there is another function that displays, on the display 720, the image data, the material data or the handwritten information received from other one(s) of the first terminal devices 10 and the second terminal devices 70, which are set in other sites. In addition, there is still another function that outputs, from the speaker, the voice data received from other one(s) of the first terminal devices 10 and the second terminal devices 70, which are set in other sites. One or more of the image data, the material data, the handwritten information, and the voice data may be collectively referred to as content data.

When the video conference is started, each of the first terminal devices 10 and the second terminal devices 70 transmits the image data, the voice data, the material data, or the handwritten information to the relay device 30, and the relay device 30 transmits the image data, the voice data, the material data or the handwritten information to the other terminal devices (the first terminal device(s) 10 or the second terminal device(s) 70) participating in the video conference. Each of the first terminal devices 10 and the second terminal devices 70 also receives the image data, the voice data, the material data, or the handwritten information from the other terminal devices (the first terminal device(s) 10 or the second terminal device(s) 70) via the relay device 30.

The management system 50 manages the communication IDs of the first terminal devices 10 and the second terminal devices 70 and functions as a call control server that performs call control by, for example, starting a session between or among two or more terminal devices when an incoming call is received. The management system 50 is a server that has a function as an information processing device. In the disclosure, "call control" is defined as a series of processing including starting a communication (call), receiving a communication (call), responding to a communication (call), ending a communication (call), or the like, that is, a series of processing for connecting to or disconnecting from a communication (call). In addition, the management system 50 often authenticates or searches the first terminal device 10 or the second terminal device 70. The management system 50 also often monitors whether each of the first terminal device 10 and the second terminal device 70 is being activated. In addition, the management system 50 also manages a database, for example such as authentication information of the first terminal device 10 and the second terminal device 70, required to control the communication system 100.

The relay device 30 is a server (information processing device) that relays the image data, the voice data, the material data, and the handwritten data (information) from one of the first terminal devices 10 and the second terminal devices 70, which is being in one site, to the other first terminal devices 10 and the second terminal devices 70, which are being in the other sites. The management system 50 monitors a bandwidth of the second communication network 2 and a communication load of the relay device 30 to assign the appropriate relay device 30 to each of the first terminal devices 10 and the second terminal devices 70.

A management terminal 40 is an information processing device used by a manager or the like of a store. On the management terminal 40, browser software runs. The management terminal 40 may be any terminal as long as the browser software runs. Examples of the management terminal 40 includes, but not limited to, a PC, a tablet terminal, a smartphone, and a PDA.

The advice providing device 3 analyzes voice data that is related to the operator (first voice data) and voice data that is related to each guest (second voice data). Each of the first terminal device 10 and the second terminal device 70 transmits the voice data to the relay device 30, and the relay device 30 transfers the voice data to the advice providing device 3. Alternatively, the relay device 30 may also serve as the advice providing device 3, or the management system 50 may also serve as the advice providing device 3. The advice providing device 3 performs voice recognition on the voice data of the operator (first voice data) and the voice data of the guest (second voice data) to convert the voice data into text data. In the disclosure, the voice recognition may be replaceable with speech recognition. This allows the advice providing device 3 to determine whether the guest asked to the operator to repeat what the operator said. In addition, this allows the advice providing device 3 to detect a speaking speed of the operator. In addition, the advice providing device 3 may analyze words included in the text data and propose a conversation topic.

Figure 3:
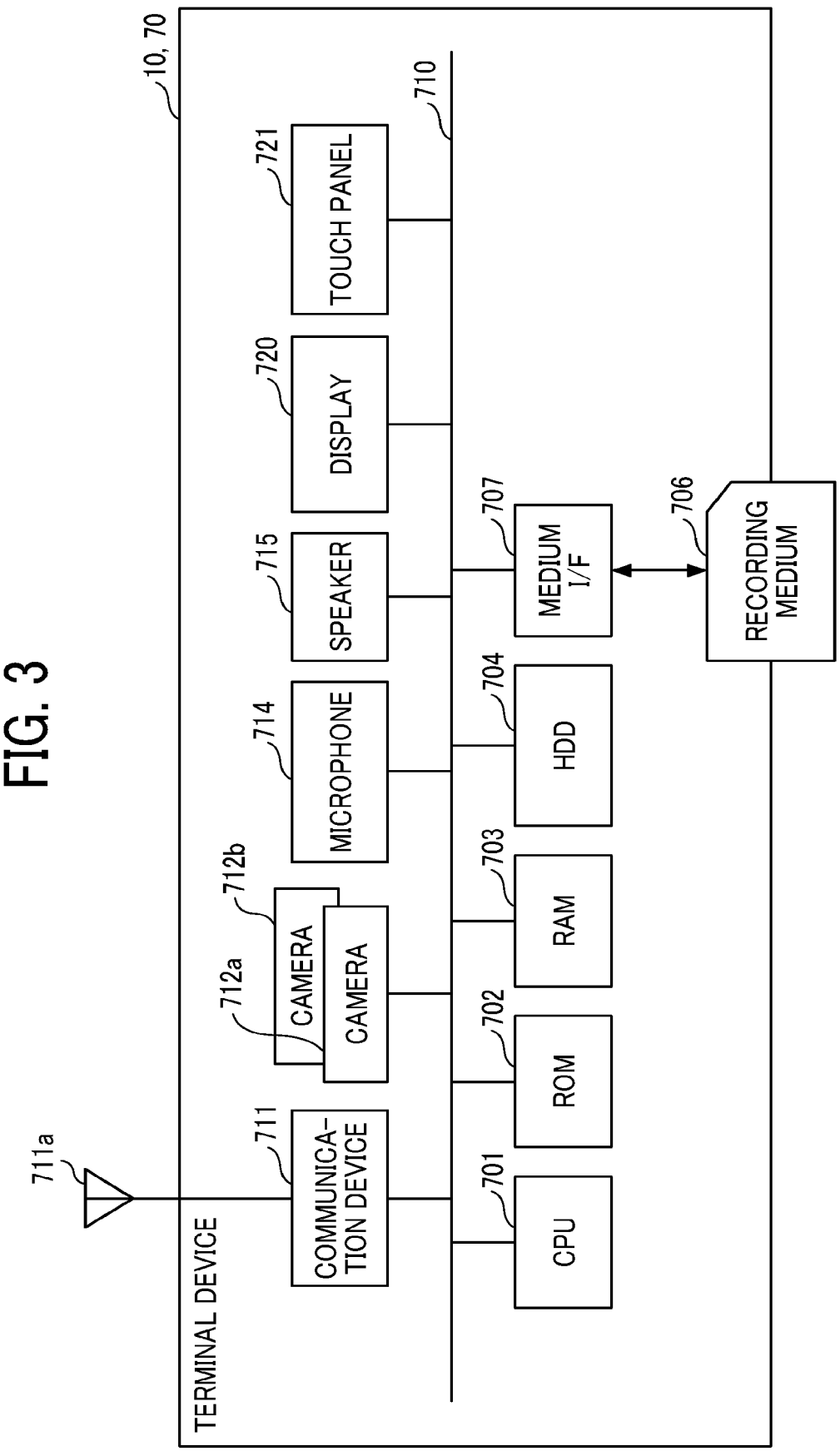
FIG. 3 is a block diagram illustrating a hardware configuration of an example of a terminal device, according to an embodiment.

Example of Hardware Configuration:
Terminal Device:

FIG. 3 is a block diagram illustrating a hardware configuration of each of the first terminal device 10 and the second terminal device 70, according to the example embodiment. Referring to FIG. 3, each of the first terminal device 10 and the second terminal device 70 includes a central processing unit (CPU) 701 that controls overall operation of the terminal device, a read only memory (ROM) 702 that stores a program, a random access memory (RAM) 703 used as a work area for driving the CPU 701, a hard disk drive (HDD) 704 that reads and writes data under control of the CPU 701, a media interface (I/F) 707 that controls reading or writing (storing) of a recording medium 706 such as a flash memory, and cameras 712a and 712b each of which captures an image of an object and obtains image data representing the image under control of the CPU 701.

The HDD 704 stores an operating system (OS) and other programs executed by the CPU 701, and various data. Each of the cameras 712a and 712b is a charge-coupled device that converts an image of an object into electronic data through photoelectric conversion. Each of the cameras 712a and 712b may be a complementary metal oxide semiconductor (CMOS) sensor or a charge-coupled device (CCD) sensor. The number of cameras 712a and 712b may be three or more. Any arbitrary one of the cameras 712a and 712b is referred to as a "camera 712".

Each of the first terminal device 10 and the second terminal device 70 further includes a microphone 714 that converts sound into an audio signal, a speaker 715 that converts the audio signal into sound, an antenna 711a, a communication device 711 that uses the antenna 711a to communicate with a base station 2a, which is the closest station, by a wireless signal, a display 720, such as a liquid crystal and organic electroluminescence (EL) display, to display an image of an object and various icons, a touch panel 721, such as a pressure-sensitive panel and an electrostatic panel, which is mounted on the display 720, to detect a position where a finger or a touch pen touch on the display 720, and a bus line 710 such as an address bus and a data bus to electrically connects the above-mentioned components to each other.

In FIG. 3, each of the numbers of microphones 714 and the numbers of speakers 715 is one, but two or more microphones 714 and two or more speakers 715 may be provided.

Figure 4:
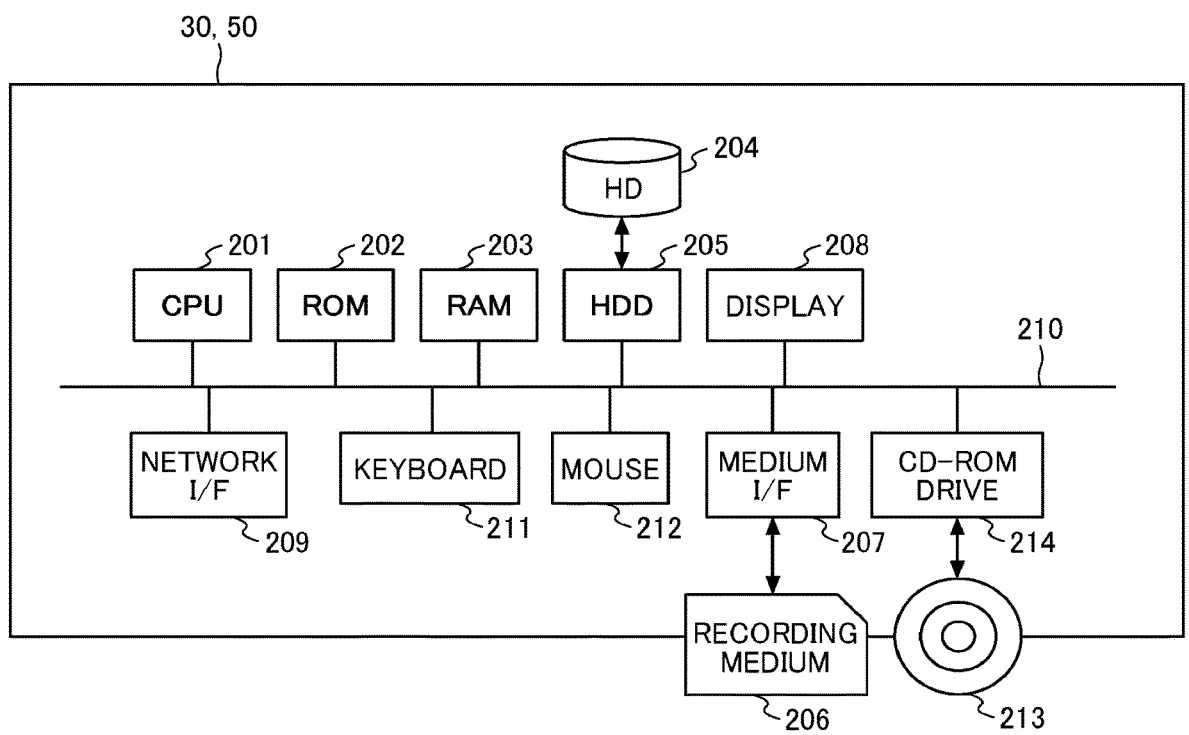
FIG. 4 is a block diagram illustrating a hardware configuration of a management system, according to an embodiment.

Management System:

FIG. 4 is a block diagram illustrating a hardware configuration of the management system 50, according to the example embodiment. Referring to FIG. 4, the management system 50 includes a CPU 201 that controls overall operation of the management system 50, a ROM 202 that stores a program used for driving the CPU 201 such as an initial program reader (IPL), a RAM 203 used as a work area for the CPU 201, the Hard Disk (HD) 204 that stores various types of data such as a program dedicated to the management system 50, a hard disk drive (HDD) 205 that controls reading/writing of various types of data from/to the HD 204 under control of the CPU 201, a medium I/F 207 (such as a medium drive) that controls reading/writing (storage) of data from/to a recording medium 206 such as a flash memory, a display 208 that displays various types of information such as a cursor, a menu, a window, characters, or an image, a network I/F 209 for transmitting data using the second communication network 2, a keyboard 211 including a plurality of keys for entering characters, numerals, and various instructions, a mouse 212 that selects and executes various instructions such as selection of a processing target or movement of the cursor, a compact disc read-only memory (CD-ROM) drive 214 that controls reading/writing of various types of data from/to a (Compact Disc-ROM) CD-ROM 213 serving as an example of a removable recording medium, and a bus line 210 such as an address bus and a data bus for electrically connecting the above-described elements.

Each of the relay device 30 and the management terminal 40 has a hardware configuration that is the same as or similar to that of the management system 50, and the descriptions thereof are omitted here.

Figure 5A:
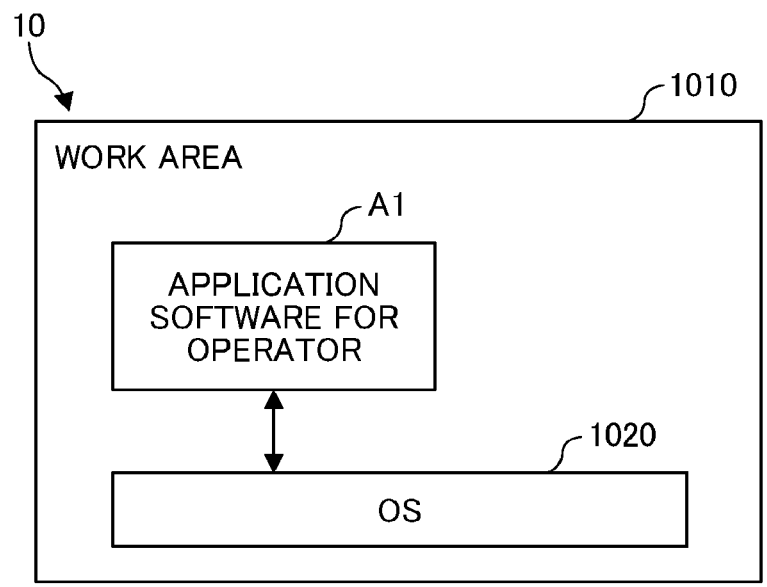
FIG. 5A is a block diagram illustrating a software configuration of a first terminal device, according to an embodiment.

Application Software:

FIG. 5A is a schematic block diagram illustrating a software configuration of the first terminal device 10 according to the example embodiment. Application software A1 that is dedicated to operators is installed on the first terminal device 10. Hereinafter, the application software A1 may be referred to as application software for operator A1. As illustrated in FIG. 5A, an OS 1020 and the application software for operator A1 operate on a work area 1010 of the RAM 703 of the first terminal device 10. The OS 1020 is basic software that controls entire operation of the first terminal device 10 through providing basic functions. The application software for operator A1 is an application for communicating with another terminal device (the first terminal device 10 or the second terminal device 70, which is a counterpart terminal device).

Figure 5B:
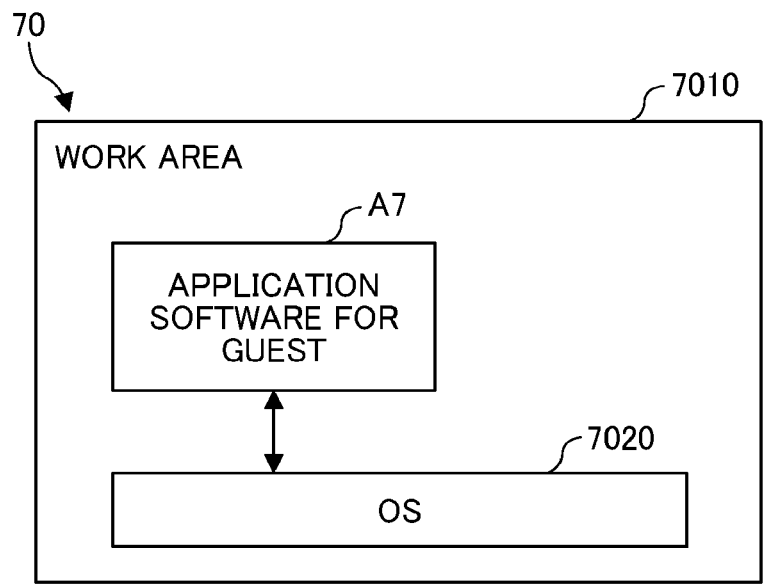
FIG. 5B is a block diagram illustrating a software configuration of a second terminal device, according to an embodiment.

FIG. 5B is a schematic block diagram illustrating a software configuration of the second terminal device 70 according to the example embodiment. Application software A7 that is dedicated to guests is installed on the second terminal device 70. Hereinafter, the application software A7 may be referred to as application software for guest A7. As illustrated in FIG. 5B, an OS 7020 and the application software for guest A7 operate on a work area 7010 of the RAM 703 of the second terminal device 70. The OS 7020 is basic software that controls entire operation of the second terminal device 70 through providing basic functions. The application software for guest A7 is an application for communicating with another terminal device (the first terminal device 10 or the second terminal devices 70, which is a counterpart terminal device).

However, the application software for guest A7 is limited in the function compared to the application software for operator A1. This is because of the design policy indicating the operation is to be basically performed by an operator and the minimum operation is to be performed by a guest. Examples of operations that a guest is allowed to perform include 1. Pressing a call button to call an operator, 2. Adjusting volume of the speaker 715, and 3. Switching between display and non-display in relation to an image at a site where the guest is. Examples of a communication protocol of the application software include, but not limited to, (1) session initial protocol (SIP), (2) H.323, (3) the extended SIP, (4) Instant Messenger (IM) Protocol, (5) protocol using the SIP message method, (6) Internet relay chat (IRC) protocol, and (7) extended IM based protocol. Examples of the above (4) IM Protocol include, but not limited to, (4-1) extensible messaging and presence protocol (XMPP), (4-2) ICQ (Registered Trademark), AIM (Registered Trademark), and Skype (Registered Trademark). In addition, an example of the above (7) extended IM-based protocol includes, but not limited to, Jingle.

Figure 6:
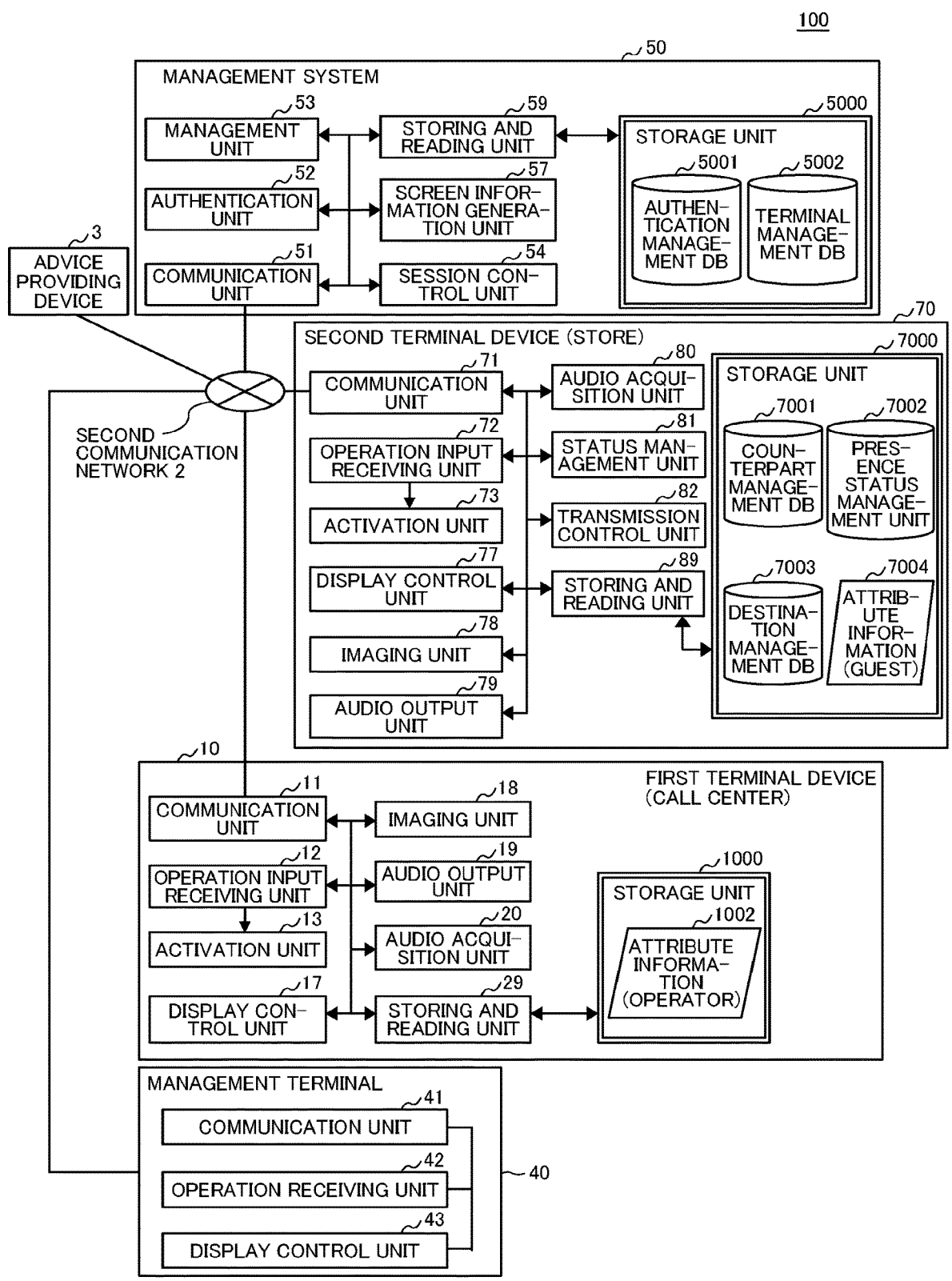
FIG. 6 is a schematic block diagram illustrating a functional configuration of an example of terminal devices and a management system included in a communication system, according to an embodiment.

Functions:

FIG. 6 is a schematic block diagram illustrating a functional configuration of the first terminal device 10, the second terminal device 70, and the management system 50 included in the communication system 100, according to the example embodiment. Note that the relay device 30 that merely relaying image data is omitted in FIG. 6.

Functional Configuration of Terminal Device:

The functions of the first terminal device 10 used by the operator of the call center 8 and the second terminal device 70 used by the guest who visits the store 7 are described below. The difference in the functions between the first terminal device 10 and the second terminal device 70 is the difference in the application software. However, the first terminal device 10 in the call center 8 and the second terminal device 70 in the store 7 may execute the same application software in which operation executable by an operator by authentication is designed, so that the functions of the first terminal device 10 may be different from the functions of the second terminal device 70.

First Terminal Device 10 in Call Center:

The first terminal device 10 set in the call center 8 includes a communication unit 11, an operation input receiving unit 12, an activation unit 13, a display control unit 17, an imaging unit 18, an audio output unit 19, an audio acquisition unit 20, and a storing and reading unit 29. These units are functions implemented by or caused to function by operating any of the hardware elements illustrated in FIG. 3 in cooperation with the instructions of the CPU 701 according to the application software for operator A1 expanded from the HDD 704 to the RAM 703.

The first terminal device 10 further includes a storage unit 1000, which is implemented by the RAM 703 and the HDD 704 illustrated in FIG. 3. The storage unit 1000 stores application software for operator A1 downloaded from, for example, the management system 50, and temporarily stores the image data, the voice data, the material data, or the handwritten information. The storage unit 1000 also stores attribute information (operator) set by the application software for operator A1.

The storage unit 1000 also stores a communication ID (Identification) for identifying the first terminal device 10, a password, and the like. ID is an abbreviation for "identification," and means an identifier or identification information. ID is one of, or a combination of two or more of a name, a code, a character string, and a numeral value, and used for uniquely distinguishing a specific target from a plurality of targets. In the embodiment, the same applies to other types of IDs than the communication ID.

The communication unit 11 transmits and receives various data (or information) to and from the management system 50 and the relay device 30 through the second communication network 2. The communication unit 11 communicates with another first terminal device 10 via the management system 50 and the relay device 30. Before starting a communication with a desired counterpart terminal (destination terminal), the communication unit 11 starts receiving status information indicating a status of each of one or more candidate counterpart terminals, from the management system 50.

The operation input receiving unit 12 receives various inputs to the first terminal device 10 from the operator in the call center 8. For example, when the operator (user) turns on the power switch, the operation input receiving unit 12 receives the power on operation and reports the received power on operation to the activation unit 13.

The activation unit 13 activates the first terminal device 10 in response to the power on operation. For example, the activation unit 13 executes the IPL to read the application software for operator A1 in the storage unit 1000 to be transferred to the RAM 703 illustrated in FIG. 3. The activation unit 13 further causes the CPU 701 to execute the application software for operator A1 so that processing, such as causing the first terminal device 10 to log in to the management system 50 is performed.

The display control unit 17 transmits the image data, the material data, and the handwritten information transmitted from the relay device 30 to the display 720. The display control unit 17 also causes the display 720 to display various screens.

The imaging unit 18 converts image data obtained by imaging an object using the camera 712a and the camera 712b into predetermined image data and outputs the image data. The imaging unit 18 may switch between the camera 712a and the 712b to output an image.

The audio output unit 19 reproduces and outputs from the speaker 715 the voice data transmitted from the relay device 30.

After voice sound of the operator is converted to voice signals (audio signals) by the microphone 714, the audio acquisition unit 20 converts the voice signals to predetermined voice data and outputs the voice data.

The storing and reading unit 29 stores various types of data in the storage unit 1000 or reads various types of data stored in the storage unit 1000.

Second Terminal Device 70 in Store:

The second terminal device 70 in the store 7 includes a communication unit 71, an operation input receiving unit 72, an activation unit 73, a display control unit 77, an imaging unit 78, an audio output unit 79, an audio acquisition unit 80, a status management unit 81, and a transmission control unit 82, and a storing and reading unit 89. In the following description of the functional configuration of the second terminal device 70, differences from the first terminal device 10 in the call center are mainly described.

The status management unit 81 is implemented by instructions of the CPU 701 and manages a status of a candidate counterpart terminal (operator), which is a candidate destination, based on presence information transmitted from the first terminal device 10.

The transmission control unit 82, which is implemented by instructions of the CPU 701, controls transmission of a call start request to the candidate counterpart terminal, which is a destination candidate, based on the status of the candidate counterpart terminal.

The storage unit 7000 of the second terminal device 70 in the store 7 includes, in addition to attribute information (guest) 7004, a counterpart management database (DB) 7001, a presence status management DB 7002, and a destination management DB 7003.

FIG. 7A is a conceptual diagram illustrating an example of the counterpart management table stored in the counterpart management DB 7001. The counterpart management table stores, a communication ID of the first terminal device 10, which is a candidate counterpart terminal used by an operator, a presence status indicating a status of the candidate counterpart terminal, and attribute information of the candidate counterpart terminal in association with one another. The attribute information includes one or more pieces of information each of which indicates an attribute, and the piece of information on attribute may be referred to as, simply, an attribute, information of attribute, or information on attribute. As the information on attribute representing an item, an abbreviation of the item of the attribute is used. The communication ID, which may be referred to as a contact ID, is information for identifying a communication destination in the communication system 100. Examples of the communication ID include, but not limited to, terminal identification information for identifying the first terminal device 10 or the second terminal device 70, such as a terminal ID, and user identification information for identifying a user of the first terminal device 10 or the second terminal device 70, such as a user account or a mail address. In the following, it is assumed that the terminal identification information is used as the communication ID. A detailed description of the presence status is given later.

FIG. 7B is a conceptual diagram illustrating an example of a presence status management table stored in the presence status management DB 7002, which is an example of a status management information storage unit. The presence status management stores, an attribute of a candidate counterpart terminal, an attribute presence status that is obtained by merging presence statuses of the candidate counterpart terminals corresponding to the attribute, (a) communication ID(s) of the first terminal device(s) 10 having a presence status of "online" that means available for starting a communication (call) (if there is any), and a communication ID(s) of the first terminal device(s) 10 having a presence status of "chat" that means busy with a communication (call) (if there is any), in association with each other. The attribute presence status may be, hereinafter, referred to as a group presence status. Hereinafter, the communication ID of the first terminal device 10 having a presence status of "online" that means available for starting a call may be simply referred to as a communication ID being online. In addition, hereinafter, the communication ID of the first terminal device 10 having a presence status of "chat" that means busy with a call may be simply referred to as a communication ID being busy. A detailed description is given later of generating an attribute presence status that is corresponding to each attribute by merging the plurality of presence statuses of the corresponding candidate counterpart terminals.

FIG. 7C is a conceptual diagram illustrating an example of a destination management table stored in the destination management DB 7003. The second terminal device 70 is used by a guest, and the first terminal device 10 is used by an operator. The second terminal device 70 may transmit a call start request to the plurality of first terminal devices 10 at the same time. The destination management table stores a communication ID of the first terminal device 10, which is a current destination for transmitting the call start request from the second terminal device 70. The number of communication IDs stored in the destination management table changes according to processing for transmitting the call start request from the second terminal device 70 or processing for cancelling the call start request.

Functional Configuration of Management System:

Returning to FIG. 6, the management system 50 includes a communication unit 51, an authentication unit 52, a management unit 53, a session control unit 54, a screen information generation unit 57, and a storing and reading unit 59. These units are functions that are implemented by or that are caused to function by operating any of the hardware elements illustrated in FIG. 4 in cooperation with the instructions of the CPU 201 according to the programs for the management system 50 expanded from the HD 204 to the RAM 203. The management system 50 further includes a storage unit 5000, which may be implemented with the HD 204. The storage unit 5000 further stores a plurality of DBs as described below.

FIG. 7D is a conceptual diagram illustrating an example of an authentication management table stored in the authentication management DB 5001. The authentication management table stores, for each one of the first terminal devices 10 and the second terminal devices 70 managed by the management system 50, a corresponding communication ID and a corresponding password in association with each other.

FIG. 7E is a conceptual diagram illustrating an example of a terminal management table stored in the terminal management DB 5002. The terminal management table stores, for each one of the first terminal devices 10 and the second terminal devices 70, a corresponding communication ID and a corresponding internet protocol (IP) address in association with each other.

Each Functional Unit of Management System:

A detailed description is now given of each of the functional units of the management system 50. The communication unit 51, which is implemented by instructions of the CPU 201 and the network I/F 209, transmits or receives various data (or information) to or from each, device or system through the second communication network 2.

The authentication unit 52, which is implemented by instructions of the CPU 201, searches the authentication management table (see FIG. 7D) using a pair of communication ID and password received by the communication unit 51 as a search key, to authenticate the first terminal device 10 or the second terminal device 70 by determining whether the same pair of communication ID and password is stored in the authentication management table.

The management unit 53, which is implemented by instructions of the CPU 201, records information on the first terminal device 10 and information on the second terminal device 70 in the terminal management table (see FIG. 7E) to manage the first terminal device 10 and the second terminal device 70.

The session control unit 54, which is implemented by instructions of the CPU 201, controls a session through which content data is transmitted between the first terminal device 10 and the second terminal device 70. Examples of the control performed by the session control unit includes control for establishing a session, control for enabling the first terminal device 10 and the second terminal device 70 to participate in an established session, and control for enabling the first terminal device 10 and the second terminal device 70 to leave a session.

The screen information generation unit 57 generates screen information indicating a screen displayed on the management terminal 40 as a web server. The screen information is generated by Hyper Text Markup Language (HTML), Extended Markup Language (XML), Cascade Style Sheet (CSS), and JavaScript (registered trademark), for example. In the embodiment, the screen information that is for displaying a screen during a call (being busy) is generated. Hereinafter, a screen displayed during a call may be referred to as a call screen. Such a screen may be referred to as a web page, and the web page may be provided by a web application. "Web application" is defined as software or a mechanism of software that is implemented by a cooperation between a program executed on a browser and written in a programming language such as JavaScript (registered trademark) and a program provided by a web server. The web page can be dynamically changed by the web application.

The storing and reading unit 59, which is implemented by instructions of the CPU 201 and the HDD 205, or the instructions of the CPU 201, stores various data in the storage unit 5000 or reads various data from the storage unit 5000.

Management Terminal:

The management terminal 40 includes a communication unit 41, an operation receiving unit 42, and a display control unit 43. These units included in the management terminal 40 are functions that are implemented by or that are caused to function by operating any of the hardware elements illustrated in FIG. 4 in cooperation with the instructions of the CPU 201 according to the programs for the management terminal 40 expanded from the HD 204 to the RAM 203. The program is browser software in the embodiment. The management terminal 40 is used by the manager of the store to acquire and display the information on each operator from the advice providing device 3.

The communication unit 41 included in the management terminal 40 transmits or receives various types of information to or from, for example, the management system 50. For example, the communication unit 41 requests a web page of portal site by Hyper Text Transfer Protocol "HTTP" communication, and transmits, to the management system 50, various types of operation content for the web page.

The operation receiving unit 42 receives various operations on the web page (screen) displayed on the management terminal 40. The display control unit 43 analyzes various types of screen information received from the management system 50 to displays a screen on the display 208.

Figure 8:
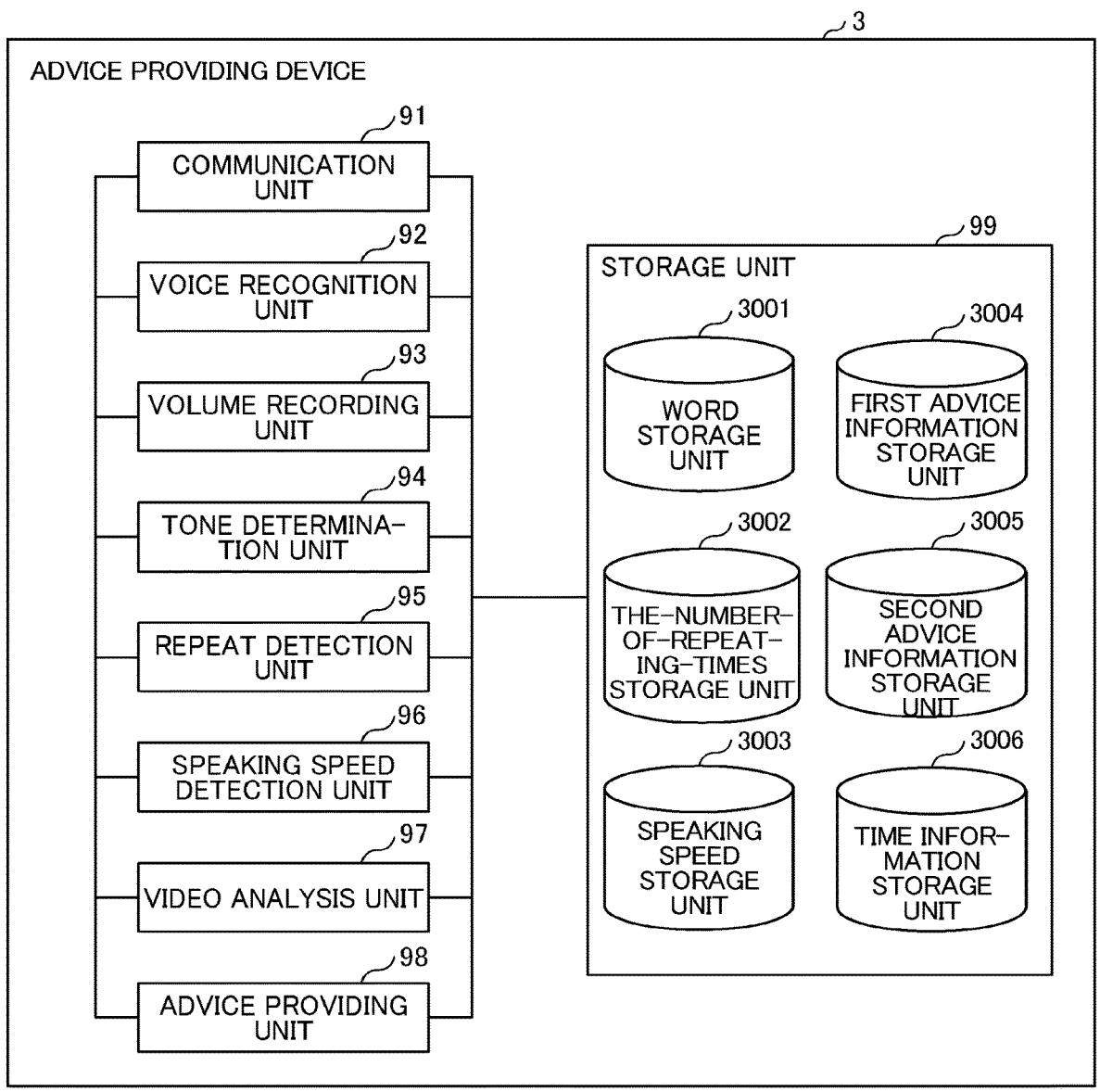
FIG. 8 is a block diagram illustrating a functional configuration of an advice providing device, according to an embodiment.

Advice Providing Device:

FIG. 8 is a block diagram illustrating a functional configuration of the advice providing device 3. The advice providing device 3 includes a communication unit 91, a voice recognition unit 92, a volume recording unit 93, a tone determination unit 94, a repeat detection unit 95, a speaking speed detection unit 96, a video analysis unit 97, and an advice providing unit 98. These units are functions that are implemented by or that are caused to function by operating any of the hardware elements illustrated in FIG. 4 in cooperation with the instructions of the CPU 201 according to the programs for the advice providing device 3 expanded from the HD 204 to the RAM 203. The advice providing device 3 further includes a storage unit 99, which may be implemented by the HD 204. The storage unit 99 further stores a plurality of DBs as described below.

FIG. 9A is a conceptual diagram illustrating an example of a word management table stored in a word storage unit 3001. The word management table records, for each word, text data representing a word in a statement that is spoken out by the operator or guest. However, a statement spoken out by the operator is not necessarily required to be sectionalized in words, as long as the statement is converted into text data. The text data is divided into parts of speech by morphological analysis. In addition, the word management table stores, for example, a voice volume, a tone, a facial expression, of the operator or the guest in speaking in association with each other. The voice volume, the tone, or the facial expression may not necessarily be stored for each word. The voice volume, the tone, or the facial expression may be stored for each unit of words. Examples of the unit of words, which is what the operator or the guest said, may include a sentence, a phrase, words spoken out in a certain period of time, or words spoken out in time until the conversation ends. The tone is intonation and represents pitch of voice or high or low of voice.

The word management table of FIG. 9A is generated for each store. When there is a plurality of guests, the advice providing device 3 may identify each of the plurality of guests by voice recognition and generate the word management table for each guest. The same applies to other tables described below.

FIG. 9B is a conceptual diagram illustrating an example of a the-number-of-repeating-times management table stored in a the-number-of-repeating-times storage unit 3002. The-number-of-repeating-times management table stores, for each conference (call), the number of times the guest asked the operator to repeat what the operator said. Hereinafter, the number of times may be referred to as the number of repeating times in the embodiments. The number of repeating times is reset at constant intervals.

FIG. 9C is a conceptual diagram illustrating an example of a speaking speed management table stored in a speaking speed storage unit 3003. The speaking speed management table stores, for each conference (call), a speaking speed (the number of words (characters)/10 sec) of each of the operator and the guest (store) in a conversation between the operator and the guest, in association with each other. The speaking speed management table may not necessarily store the speaking speed of the guest. A unit of the speaking speed representing the number of words (characters) per 10 sec is an example. As another example, the number of phrases or sentences per a certain period of time may be used. In addition, the number of words (characters) per minute may be used instead of the number of words (characters) per 10 seconds. The speaking speed is updated at constant intervals.

FIG. 9D is a conceptual diagram illustrating an example of a first advice information management table stored in a first advice information storage unit 3004. The first advice information management table stores, for each number of repeating times, which is the number of times that the guest asked the operator to repeat what the operator said, a piece of advice, and a display method, which is a way to display the advice, in association with each other. In addition to that an advice ID is stored. For example, when the number of repeating times is 20, the advice is "Speak up a little bit", and the display method is "TEXT IN RED". In addition to the text, the advice may be provided by, but not limited to, an icon, a voice message, or an alarm sound.

FIG. 9E is a conceptual diagram illustrating an example of a second advice information management table stored in a second advice information storage unit 3005. In the second advice information management table, a piece of advice and a display method are registered in association with a speed difference. For example, when the speed difference is "−10", the advice is "Speak a little bit slower" and the display method is "TEXT IN RED". The speed difference is a difference between a speaking speed of the operator and a reference value, which is determined in advance. When the speaking speed of the operator is faster (higher) than the reference value, a value of the speaking speed is a negative value, and when the speaking speed of the operator is slower (lower) than the reference value, the speaking speed is a positive value. Alternatively, the speed difference may be a difference between a speaking speed of the guest and the speaking speed of the operator in the conversation.

FIG. 9F is a conceptual diagram illustrating an example of a time information management table stored in a time information storage unit 3006. In the time information management table, a destination and an average time to serve a guest (customer) are registered, in association with each other. Hereinafter, the average time may be referred to as an average service time. In the case of a travel agency, an average service time varies depending on a destination of the customer (guest), so that a corresponding average service time is registered for each destination. The destinations may be more detailed area names than those illustrated in FIG. 9F. The average service time is an average time obtained from times each of which a guest spends for using the customer service. A time spent for the customer service is start from a point in time when a video conference (call) starts to a point in time when the video conference ends. Based on the average service time, the advice providing device 3 provides a piece of advice on a time for serving a guest.

Functional Configuration of Advice Providing Device:

A description is now given of each of the functional units of the advice providing device 3 in detail. The communication unit 91 (an example of a first communication unit) receives voice data and video data from the relay device 30 through the second communication network 2. The communication unit 91 transmits, to the first terminal device 10 of the operator, a method of improving a speaking style, some or a piece of advice on a conversation topic, or the like.

The voice recognition unit 92 converts voice data received by the communication unit 91 into text data by voice recognition. Any method may be used for performing the voice recognition. For example, specifically, maximum likelihood estimation may be performed based on learning data for statistics of a generative model, such as a hidden Markov model (HMM) or an N-gram model. In addition, a method of applying a Long short-term memory (LSTM) to a Recurrent Neural Network (RNN), which is a form of deep learning, is also known.

The voice recognition unit 92 also performs morphological analysis on the text data to convert into a word with a part of speech. As a result, a word and a part of speech are extracted. In addition, a word having a homonym may be converted to an appropriate word (for example, a word of Japanese, "sea", in Hiragana can be converted to "sea" in a Chinese character to be detected). The voice recognition unit 92 registers an extracted word in the word storage unit 3001. Both of the words spoken by the operator and the words spoken by the guest may be registered in the word storage unit 3001. Alternatively, the words spoken by at least the operator is to be registered in the word storage unit 3001. For the words spoken by the operator, at least the conversion into text data is performed in order to detect the speaking speed.

The volume recording unit 93 records at least a level of voice volume of, at least, the guest in association with a corresponding word. The level of voice volume may be an amplitude of the voice data (for example, a bit value at the time of a pulse code modulation (PCM) conversion). The voice volume may be stored for each word. Alternatively, the voice volume may be stored for each unit of words. Examples of a unit of words includes a sentence, a phrase, words spoken in a certain period of time, or words spoken in time until a conversation ends.

The tone determination unit 94 determines a tone of voice. The voice data is converted into a frequency-intensity relationship by Fourier transform or the like, and a possible frequency range is determined for each guest. For example, the possible frequency range may be determined based on measurement in the first few minutes. Then, the tone determination unit 94 divides the range into, for example, two regions, determines which one of the two range includes a frequency hiving the maximum intensity. The tone determination unit 94 records the tone of, at least, the guest in association with each word. The voice volume may be stored for each word. Alternatively, the voice volume may be stored for each unit of words. Examples of a unit of words includes a sentence, a phrase, words spoken in a certain period of time, or words spoken in time until a conversation ends.

The repeat detection unit 95 detects the number of repeating times, which is the number of times that the guest asked the operator to repeat what the operator said, by comparing the text data detected by the voice recognition unit 92 to character strings (text) stored in advance. For example, the character strings, such as "Can you say that again?", "eh?", "I can't hear you.", "Could you repeat that?", and the like are stored. When the text data corresponding to, or that matches one of the above-mentioned character strings is detected, the repeat detection unit 95 detects that the guest asked the operator to repeat what the operator said. The repeat detection unit 95 increases the number of repeating times in the the-number-of-repeating-times storage unit 3002 by one each time, when detecting that the guest asked the operator to repeat what the operator said.

The speaking speed detection unit 96 detects at least a speaking speed of the operator. The speaking speed is obtained by counting, at constant intervals, the number of characters or words (characters (syllables)) of the text data recognized by the voice recognition unit 92. The speaking speed of the guest may be also recorded. The constant intervals may be the same as, or different from that in providing advice.

Speaking speed of operator SO=the number of words (characters)/a certain period of time Speaking speed of guest SG=the number of words (characters)/a certain period of time The speaking speed detection unit 96 registers each speaking speed of the operator and the guest in the speaking speed storage unit 3003 at constant intervals. An average of speaking speed based on the data obtained in the past may be registered.

The video analysis unit 97 analyzes video data of the operator and the guest. For example, the video analysis unit 97 determines whether a user (operator or guest) has a smile on his or her face. For the operator, whether the operator has a smile on his or her face or not is registered, at constant intervals in the word storage unit 3001, for example. For guests, a facial expression (smile, normal, or the like) is registered, at constant intervals in the word storage unit 3001, for example. For detecting whether the user has a smile on his or her face or not, deep learning may be used. For the deep learning, the information processing device learns, in advance, image data on which a training signal indicating whether a face is smiling or not, via a neural network such as a Convolutional Neural Network (CNN). By learning, the video analysis unit 97 outputs a result indicating whether input video data includes a face having a smile.

The advice providing unit 98 transmits, to the first terminal device 10, advice obtained according to the number of repeating times or the speaking speed of the operator at constant intervals or in response to a request from the operator. For example, when the number of repeating times exceeds the number of repeating times registered in the first advice information storage unit 3004, the advice providing unit 98 determines to transmit the advice. In the case of the speaking speed, the advice providing unit 98 calculates "reference value-SO", and when a value obtained from the calculation is larger than a value of the speaking speed registered in the second advice information storage unit 3005, the advice providing unit 98 determines to transmit the advice.

The advice providing unit 98 may also output a list of words stored in the word storage unit 3001 as visual information, such as a graph, and transmit the list to the first terminal device 10 used by the operator.

Process/Operation of Communication System:

A description is now given of a login process in which the first terminal device 10 and the second terminal device 70 log in to the management system 50 with reference to FIG. 10. FIG. 10 is a sequence diagram illustrating an example of a process of logging in the management system 50 performed by the first terminal device 10 and the second terminal device 70, according to an embodiment of the present disclosure.

When a user, such as a staff working in the store 7, turns on of the power switch of the second terminal device 70, the operation input receiving unit 72 accepts the operation of turning on the power and starts up the second terminal device 70 (step S1). When the second terminal device 70 starts, the activation unit 73 activates the application software for guest A7 (communication application) installed on the second terminal device 70 (step S2). The steps performed by the second terminal device 70 in the process described below are executed by instructions of the application software for guest A7.

The communication unit 71 of the second terminal device 70 transmits a login request to the management system 50 through the second communication network 2 (step S3). The login request includes a communication ID for identifying the own terminal (the second terminal device 70) that sends the login request, and a password. In the present embodiment, an initial letter of the communication ID of the second terminal device 70 is "C". In the following, it is assumed that the second terminal device 70x and the second terminal device 70y are respectively assigned with the communication IDs "C01" and "C02".

The communication unit 51 of the management system 50 receives the login request. The management system 50, which is a receiving side of the login request, acquires an IP address of the second terminal device 70, which is a transmitting side of the login request, by receiving the login request transmitted from the second terminal device 70.

The authentication unit 52 of the management system 50 searches the authentication management table (FIG. 7D) of the storage unit 5000 using the communication ID and password included in the login request as a search key to authenticate the second terminal device 70 based on determination of whether the same communication ID and password are stored in the authentication management table (step S4).

When the authentication unit 52 authenticates the login request from the second terminal device 70 having the valid usage authority, the management unit 53 stores, in the terminal management table of FIG. 7E, the communication ID and the IP address of the second terminal device 70, which is a source of the login request, in association with one another (step S5).

The communication unit 51 of the management system 50 transmits authentication result information indicating an authentication result, obtained by the authentication unit 52, to the second terminal device 70, which is a source of the login request, through the second communication network 2 (step S6). Thereby, the communication unit 71 of the second terminal device 70 receives the authentication result information. In the following, a description is given of a case in which the management system 50 has successfully authenticated the second terminal device 70x and the second terminal device 70y from each of which the login request has been received, and the second terminal device 70x and the second terminal device 70y have logged in the management system 50.

On the other hand, when a user (operator), who uses the first terminal device 10 on the operator side, turns on the power switch, the operation input receiving unit 12 accepts the operation of turning on the power and starts up the first terminal device 10 (step S11). When the first terminal device 10 starts, the activation unit 13 activates the application software for operator A1 (communication application) installed in the first terminal device 10 (step S12). The steps performed by the first terminal device 10 in the process described below are executed by instructions of the application software for operator A1.

The display control unit 17 of the first terminal device 10 outputs on the display 720 a reception screen for receiving an input of an attribute of the operator who is a user of the first terminal device 10.

Figure 11:
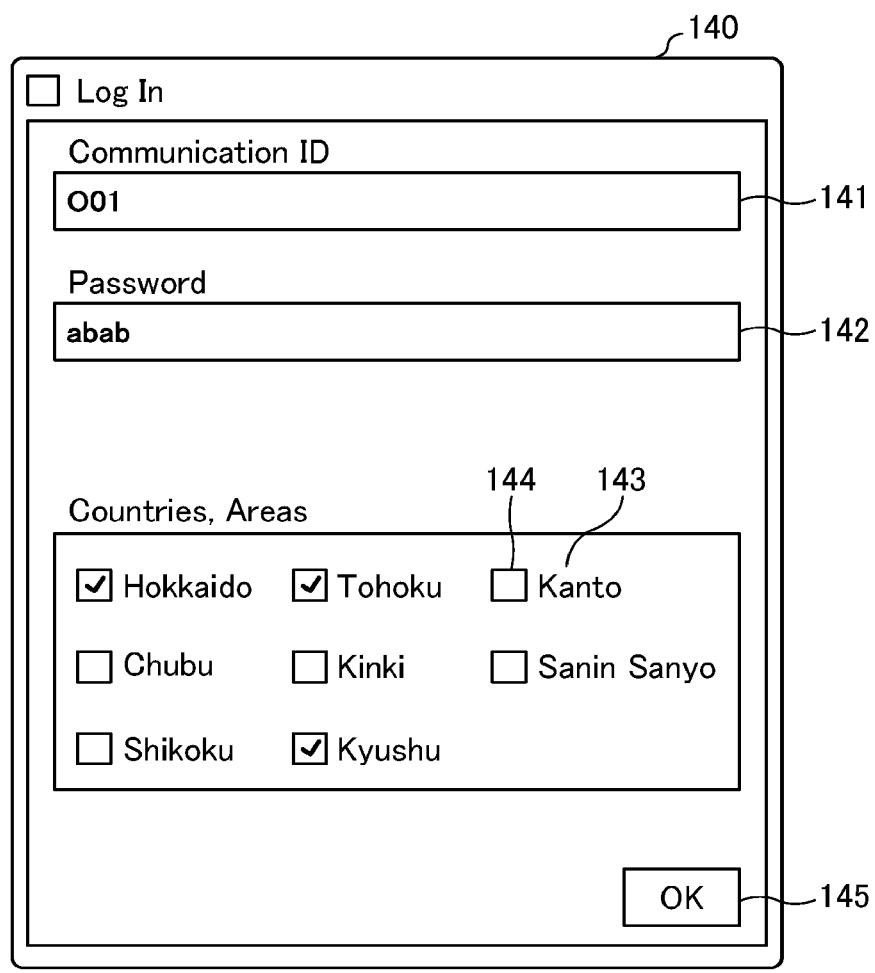
FIG. 11 is an illustration of an example of a reception screen, according to an embodiment.

FIG. 11 is an illustration of an example of a reception screen. On a reception screen 140 includes, in addition to spaces 141 and 142 for receiving inputs of a communication ID and a password, selectable checkboxes 144 each of which indicates a country or an area 143 as a destination of traveling. The country or the area 143 may be an attribute of the operator, indicating that the explanation of the country or the area 143 is providable by the operator. When the operator selects one or more countries or areas, which the operator is able to explain about, and presses an OK button 145 on the reception screen 140, the operation input receiving unit 12 accepts the input of the attribute(s) of the operator (step S13-1).

The storing and reading unit 29 stores attribute information corresponding to the selected attribute(s) in the storage unit 1000. In the description described below, information on attribute "hd", "th", "kt", "cb", "kk", "ss", "sk", and "ks", respectively represents the attributes of "Hokkaido", "Tohoku", "Kanto", "Chubu", "Kinki", "Sanin" "Sanyo", "Shikoku", and "Kyushu". Referring to FIG. 11, "hd, th, ks" is the attribute information related to the operator.

The first terminal device 10 transmits a login request to the management system 50 and logs in the management system 50 (steps S13-2, S14, S15, S16). The steps of S13-2, S14, S15 and S16 are performed in substantially the same or similar manner as or to the steps of S3, S4, S5 and S6, which are performed between the second terminal device 70 and the management system 50, and the description thereof is omitted. An initial letter of the communication ID transmitted from the first terminal device 10 to the management system 50 in the login request is "O", which represents the first terminal device 10 on the operator side. In the following, it is assumed that the first terminal device 10a, 10b and 10c are respectively assigned with the communication IDs "O01", "O02" and "O03". When the management system 50 successfully authenticates the first terminal device 10a, the first terminal device 10b, and the first terminal device 10c, from which the login request is received, the first terminal device 10a, the first terminal device 10b, and the first terminal device 10c log in the management system 50.

Figure 12:
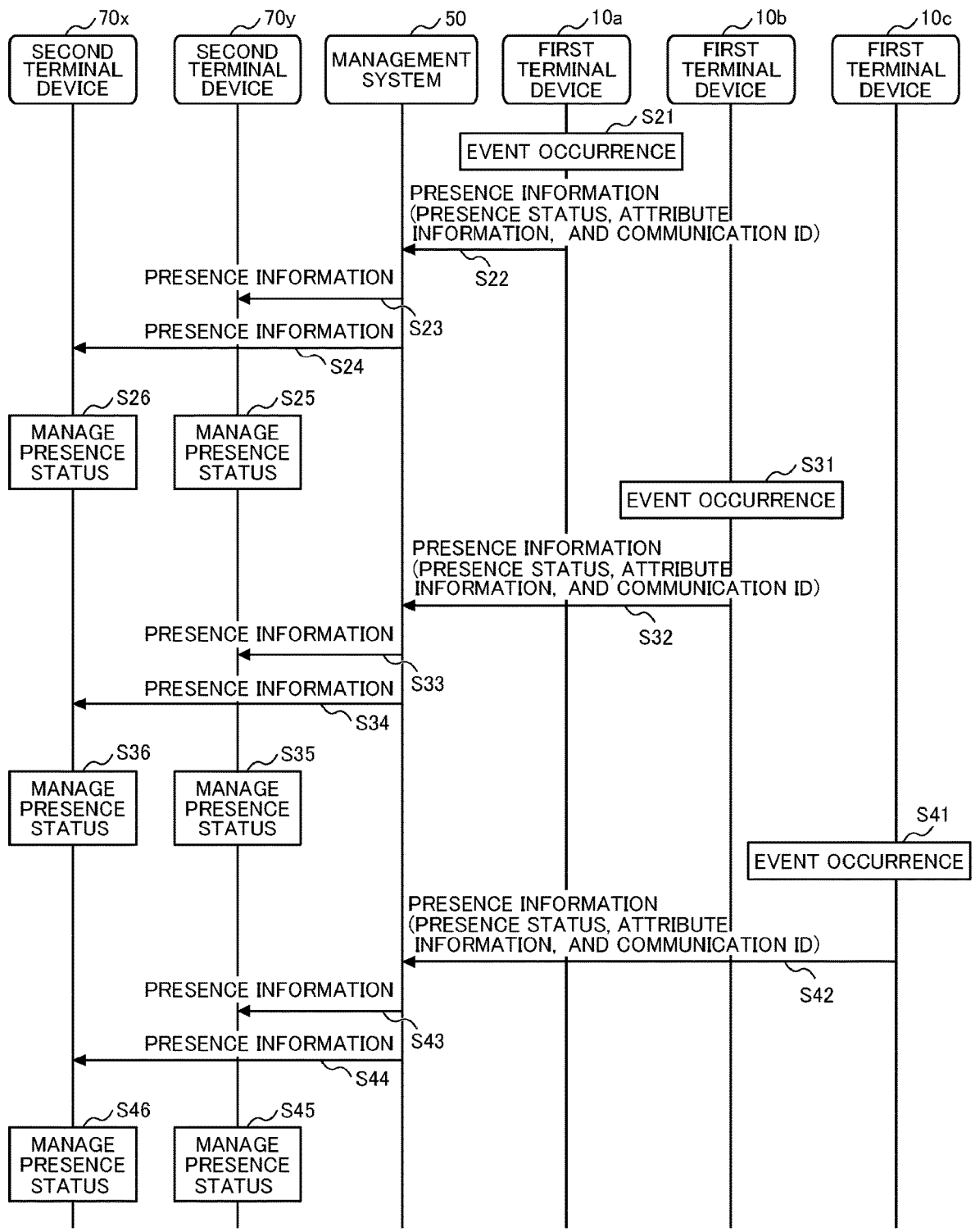
FIG. 12 is a sequence diagram illustrating an example of a process of transmitting presence information, according to an embodiment.

A description is now given of a process of transmitting presence information indicating a status of the operator side, from the first terminal device 10 to the second terminal device 70, with reference to FIG. 12. FIG. 12 is a sequence diagram illustrating an example of a process of transmitting presence information, according to an embodiment of the present disclosure.

The application software for operator A1 manages, in the storage unit 1000, the event that triggers the status transition and the presence status after the transition due to the event occurrence. The presence status is used to determine whether the operator, who is a user of the first terminal device 10, is in a status of being able to start a call. The presence status indicating that a call is available (a call can be started) includes "online" indicating that the first terminal device 10 is logged in the management system 50 and is not currently communicating with the second terminal device 70, which is a terminal device on the guest side. The presence status indicating that a call is not available includes "offline" indicating that the first terminal device 10 is not logged in the management system 50. In addition, the presence status indicating that a call is not available includes "chat" indicating that the first terminal device 10 is logged in the management system 50 but starting a new call is not acceptable, because the first terminal device 10 is busy with a current communication (call) with the second terminal device 70, which is a terminal device on the guest side. The presence statuses described above are just examples, and any other suitable presence status may be used. For example, the presence status may be based on a user input. As an example of the presence status based on the user input, a presence status of "away" indicating that the user is not able to start a call (online communication) may be used.

An example of an event that triggers a status of the first terminal device 10 to transition to the presence status of "online" is an event of receiving the authentication result information (S16), or an event of accepting an input of a communication end request from the user. An example of an event that triggers a status of the first terminal device 10 to transition to the presence status of "offline" is an event of logging out from the management system 50. An example of an event that triggers a status of the first terminal device 10 to transition to the presence status of "chat" is an event of establishing a communication with the second terminal device 70 (S105, described later). In addition, note that an event that triggers the transition of the presence status is not particularly limited as long as it is detectable, and is able to be appropriately set according to a communication protocol and content of processing performed with application software.

When any one of the events described above occurs in the first terminal device 10a (step S21), the storing and reading unit 29 reads the attribute information from the storage unit 1000. The attribute information to be read includes an attribute of "Hokkaido" that is input on the reception screen 140 illustrated in FIG. 11 by the operator who is a user of the first terminal device 10a at a time of the log-in. The communication unit 11 of the first terminal device 10a transmits the presence information to the management system 50 (step S22). The presence information transmitted in S22 includes a presence status of the first terminal device 10a after the transition triggered by the event occurred in S21, the attribute information read from the storage unit 1000, and the communication ID, "OO1", of the first terminal device 10a, which is a transmission source. When receiving the authentication result in S16, the first terminal device 10a transmits the presence information including the presence status, "online", to the management system 50. In addition, when the logout request is accepted, the first terminal device 10a transmits the presence information including the presence status, "offline", to the management system 50. When establishing a communication with the second terminal device 70, the first terminal device 10a transmits presence information including the presence status, "chat", to the management system 50. While the attribute information is not updated after the attribute information is registered in the storage unit 1000 in S13-1, the first terminal device 10a transmits the presence information including the same attribute information to the managements system 50 each time when the event occurs.

In response to receiving the presence information from the first terminal device 10a, the communication unit 51 of the management system 50 transmits the received presence information to the second terminal device 70x and the second terminal device 70y each of which is set in one of the stores 7 and logged in the management system 50 (steps S23, S24).

A method of identifying the second terminal device 70 that is currently logged in the management system 50 on the store (guest) side is not particularly limited. As an example, the terminal management table (see FIG. 7E) may be used to read the communication ID having "C" as an initial letter from the terminal management table illustrated in FIG. 7E. Each communication units 71 of the second terminal devices 70x and 70y receives the presence information transmitted from the first terminal device 10a of the call center 8 via the management system 50. Each storing and reading unit 89 of the second terminal device 70x and the second terminal device 70y stores the communication ID, the presence status, and the attribute information, which are included in the received presence information, in the counterpart management table (FIG. 7A) in association with one another (steps S25, S26). In a case in which the counterpart management table already contains a record of the same communication ID as the communication ID included in the received presence information, the storing and reading unit 89 overwrites the presence status existing in the record with a new presence status based on the received presence information. Thus, each of the second terminal device 70x and the second terminal device 70y manages the latest presence status of the first terminal device 10a.

When any one of the events as described above occurs at the first terminal device 10b on the operator side, the processing of S31, S32, S33, S34, S35 and S36 are performed between the first terminal device 10b, the management system 50, the second terminal device 70x, and the second terminal device 70y in substantially the same or similar manner as or to the processing of S21, S22, S23, S24, S25 and S26 performed between the first terminal device 10a, the management system 50, the second terminal device 70x and the second terminal device 70y. When any one of the events as described above occurs at the first terminal device 10c on the operator side, the processing of S41, S42, S43, S44, S45 and S46 are performed between the first terminal device 10b, the management system 50, the second terminal device 70x, and the second terminal device 70y in substantially the same or similar manner as or to the processing of S21, S22, S23, S24, S25 and S26 performed between the first terminal device 10a, the management system 50, the second terminal device 70x and the second terminal device 70y. Thus, each of the second terminal device 70x and the second terminal device 70y manages the latest presence status of each of the first terminal device 10b and the first terminal device 10c.

Figure 13:
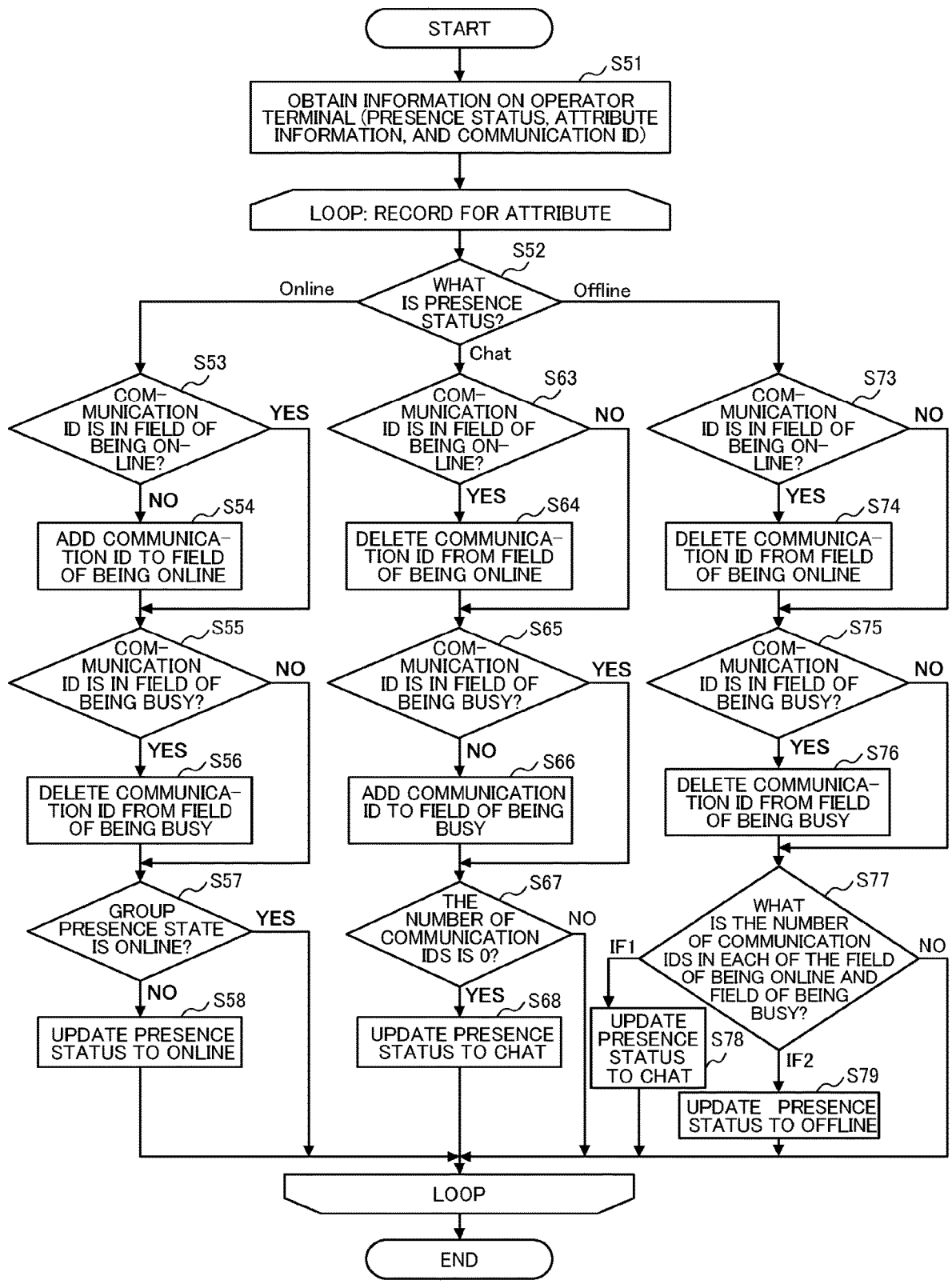
FIG. 13 is a flowchart illustrating an example of a process of managing a presence status for each attribute, according to an embodiment.

A description is now given of a process of managing a presence status for each attribute, with reference to FIG. 13. FIG. 13 is a flowchart illustrating an example of a process of managing a presence status for each attribute. In the embodiment described below, it is assumed that a call is requested from the guest side to the operator side, and a terminal on the operator side is referred to as a candidate counterpart terminal, or an operator terminal. When the operator of the candidate counterpart terminal selects a plurality of attributes (for example, "Hokkaido, Tohoku, and Kyushu") in S13-1 of FIG. 10, the candidate counterpart terminal belongs to some attribute groups each of which corresponds to one of the plurality of attributes. When the attribute presence status of a certain attribute is "Online", at least one of the candidate counterpart terminals belonging to the attribute group corresponding to the certain attribute is "Online", which is a presence status indicating that a call is available. When the attribute presence status of a certain attribute is "Chat", none of the candidate counterpart terminals belonging to the attribute group corresponding to the certain attribute is "Online", and at least one of the candidate counterpart terminals belonging to the attribute group corresponding to the certain attribute is "Chat", which is a presence status indicating being busy with a call.

When the attribute presence status of a certain attribute is "Offline", the presence statuses of all of the candidate counterpart terminals belonging to the attribute group corresponding to the certain attribute are "Offline". A description is now given of operation performed by the second terminal device 70x. The second terminal device 70y is also capable of performing the same operation described below.

Each time when the presence status in the counterpart management table (FIG. 7A) is updated in S26, S36, and S46, the status management unit 81 of the second terminal device 70x obtains the communication ID, the presence status, and the attribute information, which are included in the updated record (step S51).

The status management unit 81 of the second terminal device 70x updates a record including the attribute information obtained in S51 in the presence management table (FIG. 7B). In other words, when the attribute information, "hd, th, ks" is obtained in S51, the status management unit 81 updates each record including the attribute "hd", "th" or "ks" in the presence management table.

A description is now given of, as an example, operation performed when the first terminal device 10a transmits, via the management system 50, the presence information "online, (hd, th, ks), O01" to the second terminal device 70x, and the status management unit 81 obtains the presence information in S51 (S52: Online).

First, a description is given of updating a record including the attribute "hd" in the presence management table by loop processing. The status management unit 81 of the second terminal device 70x refers to a field of communication ID being online (available for a call) in the record including the attribute "hd" in the presence management table. By referring to the presence management table as described above, the status management unit 81 determines whether the communication ID "O01" obtained in S51 is included in the field of communication ID being online (step S53).

When determining that the communication ID "O01" obtained in S51 is not included in the field of communication ID being online in the presence management table (S53: NO), the status management unit 81 adds the obtained communication ID "O01" to the field of communication ID being online (step S54).

When the processing of S54 is completed, or when the result of step S53 is YES, the status management unit 81 of the second terminal device 70x refers to the field of communication ID being busy (with a call) in the record including the attribute "hd" in the presence management table. By referring to the presence management table as described above, the status management unit 81 determines whether the communication ID "O01" obtained in S51 is included in the field of communication ID being busy (step S55).

When the status management unit 81 determines that the communication ID "O01" obtained in S51 is included in the field of communication ID being busy in the presence management table (S55: YES), the status management unit 81 deletes the obtained communication ID "O01" from the field of communication ID being busy (step S56). Through the processing described above, when the presence status of the first terminal device 10a transitions from "chat" to "online" or from "offline" to "online," the communication ID of the first terminal device 10a is recorded in the field of communication ID being online (available for a call), but not stored in the other fields, in the record including the attribute "hd".

When the processing of S56 is completed, or when S55 is NO, the status management unit 81 of the second terminal device 70x refers to the presence management table for an attribute presence status in the record including the attribute "hd". By doing so, the status management unit 81 determines whether the group presence status (attribute presence status) is "online" (step S57).

When determining that the attribute presence status in the record including the attribute "hd" is not "online" (S57: NO), the status management unit 81 updates the attribute presence status to "online". When the status management unit 81 determines that the attribute presence status in the record including the attribute "hd" is "online" (S57: YES), the status management unit 81 does not update the attribute presence status in the record including the attribute "hd". Through the processing described above, the attribute presence status in the record including the attribute "hd", in the presence management table, is "online" (step S58).

Since the attribute information "hd, th, ks" is obtained in S51, the status management unit 81 performs the loop processing for each record including the attribute "th" or the attribute "ks" in the presence management table to update the record, in substantially the same manner. When the loop processing is completed, the presence management table in FIG. 7B is updated as Table 1. In addition, the update or the change of the presence status is also reflected to the counterpart management table illustrated in FIG. 7A.

TABLE 1

| ATTRIBUTE | PRESENCE STATUS | COMMUNICATION ID BEING ONLINE | COMMUNICATION ID BEING BUSY |
|---|---|---|---|
| hd | online | O02, O03, O01 | |
| th | online | O01 | |
| kt | online | O03 | |
| cb | online | O02, O03 | |
| kk | online | O02 | |
| ss | offline | | |
| sk | online | O02 | |
| ks | online | O01 | |

Next, a description is given of operation performed when the first terminal device 10a transmits, via the management system 50, the presence information "chat, (hd, th, ks), O01" to the second terminal device 70x, and the status management unit 81 obtains the presence information in S51 (S52: Chat).

First, a description is given of updating a record including the attribute "hd" in the presence management table by loop processing. The status management unit 81 of the second terminal device 70x refers to the field of communication ID being online (available for a call) in the record including the attribute "hd" in the presence management table (See Table 1). By referring to the presence management table as described above, the status management unit 81 determines whether the communication ID "O01" obtained in S51 is included in the field of communication ID being online (step S63).

When determining that the communication ID "O01" obtained in S51 is included in the field of communication ID being online in the presence management table (S63: YES), the status management unit 81 deletes the obtained communication ID "O01" from the field of communication ID being online (step S64).

When the processing of S64 is completed, or when the result of step S63 is NO, the status management unit 81 of the second terminal device 70x refers to the field of communication ID being online in the record including the attribute "hd" in the presence management table (See Table 1). By referring to the presence management table as described above, the status management unit 81 determines whether the communication ID "O01" obtained in S51 is included in the field of communication ID being busy (step S65).

When determining that the communication ID "O01" obtained in S51 is not included in the field of communication ID being busy in the presence management table (S65: NO), the status management unit 81 adds the obtained communication ID "O01" to the field of communication ID being busy (step S66). Through the processing described above, the communication ID of the first terminal device 10a is recorded in the field of communication ID being busy in the record including the attribute "hd" in the presence management table.

When the processing of S66 is completed, or when the result of step S65 is YES, the status management unit 81 of the second terminal device 70x refers to the field of communication ID being online in the record including the attribute "hd" in the presence management table. By referring to the presence management table as described above, the status management unit 81 determines whether the number of the communication IDs recorded in the field of communication ID being online in the record having the attribute "hd" is 0 (step S67).

When the number of communication IDs recorded in the field of communication ID being online in the record including the attribute "hd" is 0 (S67: YES), the status management unit 81 updates the attribute presence status in the record including the attribute "hd" to "chat" (step S68).

When the number of communication IDs recorded in the field of communication ID being online in the record including the attribute "hd" is not 0 (S67: NO), the status management unit 81 does not update the attribute presence status in the record including the attribute "hd". That is, when the communication ID is recorded in the field of communication ID being online in the record including the attribute "hd", a corresponding attribute presence status remains as "online" without being updated.

Since the attribute information "hd, th, ks" is obtained in S51, the status management unit 81 performs the loop processing for each record including the attribute "th" or the attribute "ks" in the presence management table to update the record, in substantially the same manner. Accordingly, the presence management table of Table 1 becomes as Table 2.

TABLE 2

| ATTRIBUTE | PRESENCE STATUS | COMMUNICATION ID BEING ONLINE | COMMUNICATION ID BEING BUSY |
|---|---|---|---|
| hd | online | O02, O03 | O01 |
| th | chat |  | O01 |
| kt | online | O03 |  |
| cb | online | O02, O03 |  |
| kk | online | O02 |  |
| ss | offline |  |  |
| sk | online | O02 |  |
| ks | chat |  | O01 |

Next, a description is now given of operation performed when the first terminal device 10a transmits, via the management system 50, the presence information "offline, (hd, th, ks), O03" to the second terminal device 70x, and the status management unit 81 obtains the presence information in S51 (S52: Offline).

First, a description is given of updating a record including the attribute "hd" in the presence management table by loop processing. The status management unit 81 of the second terminal device 70x refers to the field of communication ID being online (available for a call) in a record including the attribute "hd" in the presence management table (See Table 2). By referring to the presence management table as described above, the status management unit 81 determines whether the communication ID, "O03", obtained in S51 is included in the field of communication ID being online (step S73).

When determining that the communication ID "O03" obtained in S51 is included in the field of communication ID being online in the presence management table (S73: YES), the status management unit 81 deletes the obtained communication ID "O03" from the field of communication ID being online (step S74).

When the processing of S74 is completed, or when the result of step S73 is NO, the status management unit 81 of the second terminal device 70x refers to the field of communication ID being busy (with a call) in the record including the attribute "hd" in the presence management table (See Table 2). By referring to the presence management table as described above, the status management unit 81 determines whether the communication ID, "O03", obtained in S51 is included in the field of communication ID being busy (step S75).

When the determination indicates that the communication ID, "O03", obtained in S51 is included in the field of communication ID being busy in the presence management table (S75: YES), the obtained communication ID, "O03", is deleted from the field of communication ID being busy (step S76). Through the processing described above, the communication ID of the first terminal device 10c is deleted from the record including the attribute "hd" in the presence management table.

When the processing of S76 is completed, or when the result of step S75 is NO, the status management unit 81 of the second terminal device 70x refers to the field of communication ID being online and the field of communication ID being busy in the record including the attribute "hd" in the presence management table (See Table 2). By doing so, the status management unit 81 determines whether the condition IF1 or the condition IF2 is satisfied (step S77). The condition IF1 is satisfied when the number of communication IDs included in the field of communication ID being online in the record including the attribute "hd" is 0 and the number of communication IDs included in the field of communication ID being busy is not 0. The condition IF2 is satisfied when the number of communication IDs included in the field of communication ID being online in the record including the attribute "hd" is 0 and the number of communication IDs included in the field of communication ID being busy is 0.

When the number of the communication IDs recorded in the field of communication ID being online in the record including the attribute "hd" is 0 and the number of the communication IDs being busy in the field of the same record is not 0 (S77: IF1), the status management unit 81 updates the attribute presence status of the record including the attribute "hd" to "chat" in the presence management table (step S78).

When the number of the communication IDs recorded in the field of communication ID being online in the record including the attribute "hd" is 0 and the number of the communication IDs being busy in the field of the same record is 0 (S77: IF2), the status management unit 81 updates the attribute presence status of the record including the attribute "hd" to "offline" in the presence management table (step S79).

When neither IF1 nor IF2 is satisfied in step S77 (S77: NO), the status management unit 81 does not update the attribute presence status in the record, which the attribute "hd" is recorded, and remains the attribute presence status as "online".

Since the attribute information "hd, kt, cb" is obtained in S51, the status management unit 81 performs the loop processing for each record including the attribute "kt" or the attribute "cb" in the presence management table to update the record, in substantially the same manner. Through this, the presence management table of Table 2 becomes as Table 3.

TABLE 3

| ATTRIBUTE | PRESENCE STATUS | COMMUNICATION ID BEING ONLINE | COMMUNICATION ID BEING BUSY |
|---|---|---|---|
| hd | online | O02 | O01 |
| th | chat | | O01 |
| kt | offline | | |
| cb | online | O02 | |
| kk | online | O02 | |
| ss | offline | | |
| sk | online | O02 | |
| ks | chat | | O01 |

Figure 14:
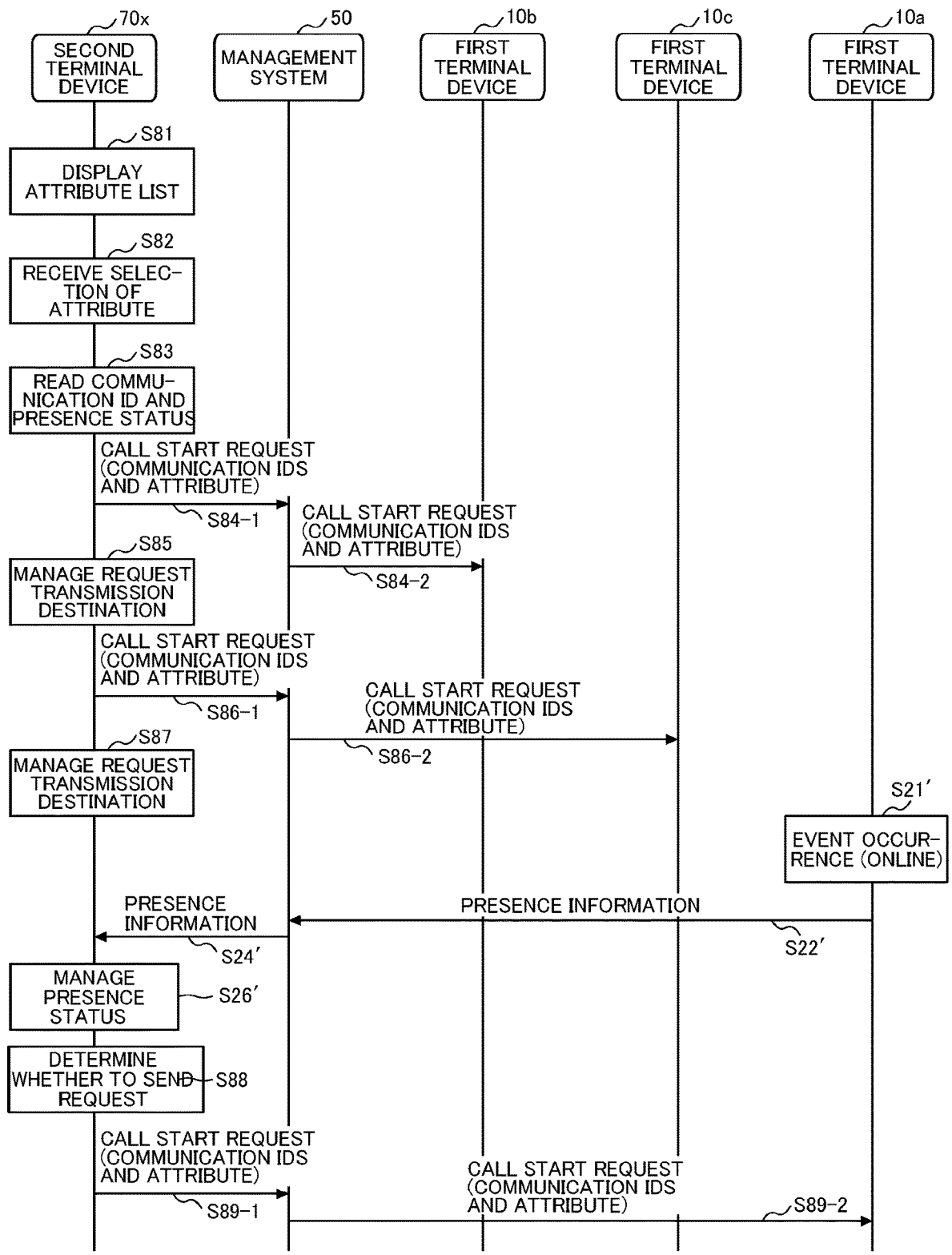
FIG. 14 is a sequence diagram illustrating an example of a process of starting communication, according to an embodiment.

A description is now given of a process of starting communication, with reference to FIG. 14. FIG. 14 is a sequence diagram illustrating an example of a process of starting communication, according to an embodiment of the present disclosure. As an example, in the following description, the second terminal device 70x starts a communication. However, the second terminal device 70y is also capable of starting communication in substantially the same manner as the second terminal device 70x. In the following description, it is assumed that the counterpart management table is in a state of FIG. 7A and the presence management table is in a state of Table 2 at the time of starting the process of FIG. 14.

The operation input receiving unit 72 of the second terminal device 70x receives a display request for displaying a list of attributes (attribute list) of the candidate counterpart according to a user input. In response to a display request, the display control unit 77 acquires the information on attributes and the group presence statuses corresponding to the attributes, recorded in the presence management table (See Table 2). The storage unit 7000 stores data representing a display image (display image data) corresponding to each attribute and each attribute presence status in advance. For example, the data representing the display image includes text data, representing "Hokkaido", which corresponds to the information of attribute "hd". Further, for example, data representing a display image corresponding to the attribute presence status "online", data representing a display image corresponding to the attribute presence status "offline", and data representing a display image corresponding to the attribute presence status "chat" are image data of normal brightness, image data of low brightness, and image data of normal brightness with a balloon-shaped icon, respectively. The display control unit 77 acquires, from the storage unit 7000, pairs of the display image data of text and the display image data of the brightness or the icon corresponding to the acquired pairs of the information on attributes and the attribute presence statuses. The display control unit 77 generates image data representing an attribute list by arranging the acquired pairs of the display image data described above, in the same line of a display area in manners that the data in a pair associate with each other. The display control unit 77 outputs the generated image data of the attribute list to the display 720 (step S81).

Figure 15:
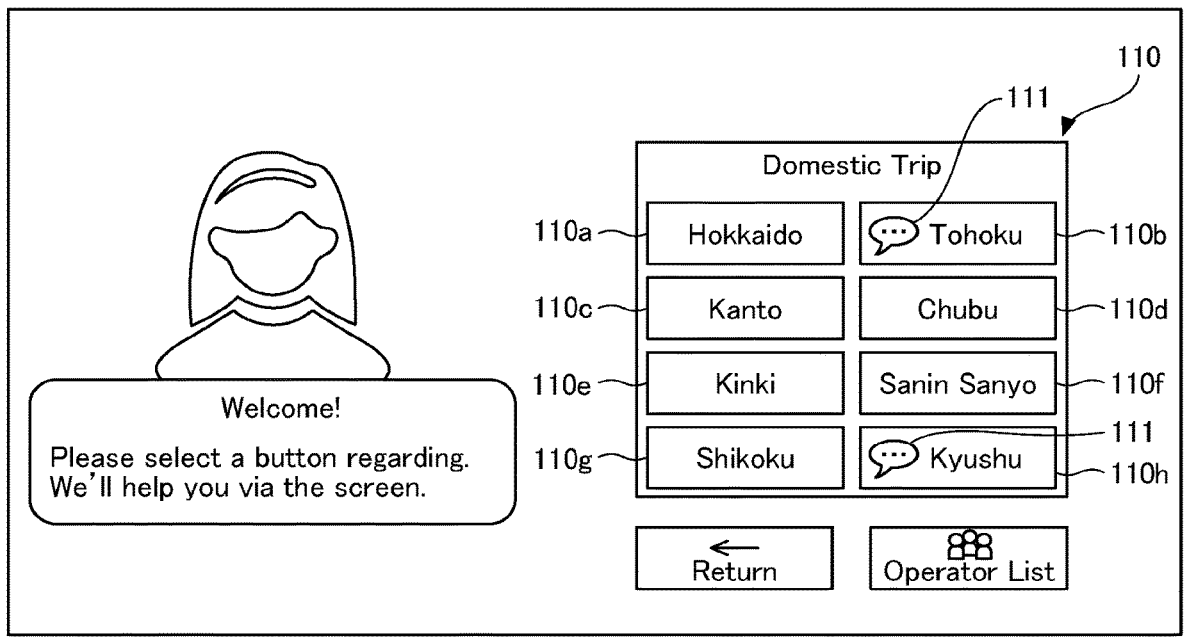
FIG. 15 is an illustration of an example of a screen on which an attribute list is displayed when the presence management table is in a state of Table 2, according to an embodiment.

FIG. 15 is an illustration of an example of a screen on which an attribute list is displayed when the presence management table is in the state of Table 2.

The display control unit 77 repeats the above process each time when the presence management table is updated. Thereby, the attribute list indicating the latest presence status for each attribute is displayed on the display 720.

In S81, the display control unit 77 outputs an item (button) corresponding to "online" as a normal brightness item (button), an item (button) corresponding to "offline" as a low brightness item (button), and an item corresponding to "chat" as a normal brightness item (button) with a balloon-shaped icon. In FIG. 15, balloon-shaped icons 111 are displayed in association with "Tohoku" 110b and "Kyushu" 110h. Further, "Sanin Sanyo" 110f is displayed with low brightness.

For example, when a user operation of pressing an icon that corresponds to "Tohoku" or "Kyushu" in the attribute list illustrated in FIG. 15 is performed, the operation input receiving unit 72 receives the user operation and displays information indicating that the operator is busy on a call. On the other hand, when a user operation of pressing the "Sanin Sanyo" item in the attribute list illustrated in FIG. 15 is performed, the operation input receiving unit 72 receives the user operation and displays information indicating that the operator is absent.

A description is given now of operation performed in a case in which selection of the attribute "Hokkaido" is received. The operation input receiving unit 72 receives a selection of the attribute "Hokkaido" (step S82).

When the selection of the attribute "Hokkaido" is accepted, the storing and reading unit 89 searches the destination management table of FIG. 7A using the information of attribute "hd" selected in S82 as a search key, and reads the corresponding pairs of communication ID and presence status, "O01, chat", "O02, online", and "O03, online" (step S83).

The communication unit 71 of the second terminal device 70x transmits a call start request to the management system 50 (S84-1). The call start request includes the communication ID "O02" that is associated with the presence status "online" from among the communication IDs read in S83, the communication ID "C01" of the own terminal (second terminal device 70x), and the attribute "hd" indicating the attribute selected in S82.

In substantially the same manner as described above, the communication unit 71 of the second terminal device 70x transmits a call start request to the management system 50 (step S86-1). The call start request includes the communication ID "O03" that is associated with the presence status "online" from among the communication IDs read in S83, the communication ID "C01" of the own terminal (second terminal device 70x), and the attribute "hd" indicating the attribute selected in S82.

In response to the call start request transmitted from the second terminal device 70x in S84-1, the communication unit 51 of the management system 50 transmits the call start request to the first terminal device 10b identified by the communication ID "O02" included in the call start request (step S84-2). In substantially the same manner as described above, in response to the call start request transmitted from the second terminal device 70x in S86-1, the communication unit 51 of the management system 50 transmits the call start request to the first terminal device 10c identified by the communication ID "O03" included in the call start request (step S86-2).

The transmission control unit 82 of the second terminal device 70x updates the destination management table by storing the communication ID "O02" of the first terminal device 10b, which is a destination of the call start request, in the destination management table (step S85). In substantially the same manner as described above, the transmission control unit 82 of the second terminal device 70x updates the destination management table by storing the communication ID "O03" of the first terminal device 10c, which is a destination of the call start request, in the destination management table (step S87).

When a user operation of inputting a call end request is accepted in the first terminal device 10a on the operator side (step S21'), the communication unit 11 transmits the presence information that is read from the storage unit 1000, to the management system 50 (step S22'). This presence information includes the attribute information "hd, th, ks", the communication ID "O01" of the first terminal device 10a, and the presence status "online" of the first terminal device 10a.

When receiving the presence information from the first terminal device 10a, the communication unit 51 of the management system 50 transmits the received presence information to the second terminal device 70x that is on the guest side and logged in the management system 50 (step S24').

The communication unit 71 of the second terminal device 70x receives the presence information from the first terminal device 10a of the operator side via the management system 50. The storing and reading unit 89 of the second terminal device 70x stores the communication ID, the presence status, and the attribute information, which are included in the received presence information, in the counterpart management table (step S26'). Accordingly, the counterpart management table is updated from the state of FIG. 7A to the state of Table 4.

TABLE 4

| COMMUNICATION ID | PRESENCE STATUS | ATTRIBUTE INFORMATION |
|---|---|---|
| O01 | online | hd, th, ks |
| O02 | online | hd, cb, kk, ks |
| O03 | online | hd, kt, cb |

The transmission control unit 82 of the second terminal device 70x determines whether to transmit a call start request to the first terminal device 10a, which is a source of the presence information received in S24' (step S88). More specifically, the transmission control unit 82 of the second terminal device 70x refers to the counterpart management table for the updated presence status of the first terminal device 10a, to determine whether the current presence status is "online". When the current presence status of the first terminal device 10a is a status other than "online", the transmission control unit 82 determines not to transmit a call start request. Then, the process ends.

When the current presence status of the first terminal device 10a is "online", the transmission control unit 82 refers to the attribute information "hd, th, ks" of the first terminal device 10a stored in the counterpart management table. Then the transmission control unit 82 determines whether any one of the attributes included in, or indicated by, the attribute information represents the attribute "Hokkaido", which is selected in S82. When determining none of the attributes included in, or indicated by, the attribute information is selected in S82, the transmission control unit 82 determines not to transmit a call start request. Then, the process ends.

When any one of the attributes included in, or indicated by, the attribute information is selected, the transmission control unit 82 of the second terminal device 70x determines to transmit a call start request. In response to a determination that a call start request is to be transmitted, the communication unit 71 of the second terminal device 70x transmits a call start request to the management system 50 (step S89-1). The call start request includes the communication ID "O01" of the first terminal device 10a, which is a source of the presence information, the communication ID "C01" of the own terminal (second terminal device 70x), and the attribute, "hd", which is selected in S82.

In response to the call start request transmitted from the second terminal device 70x in S89-1, the communication unit 51 of the management system 50 transmits the call start request to the first terminal device 10a identified by the communication ID "O01" included in the call start request (step S89-2).

Figure 16:
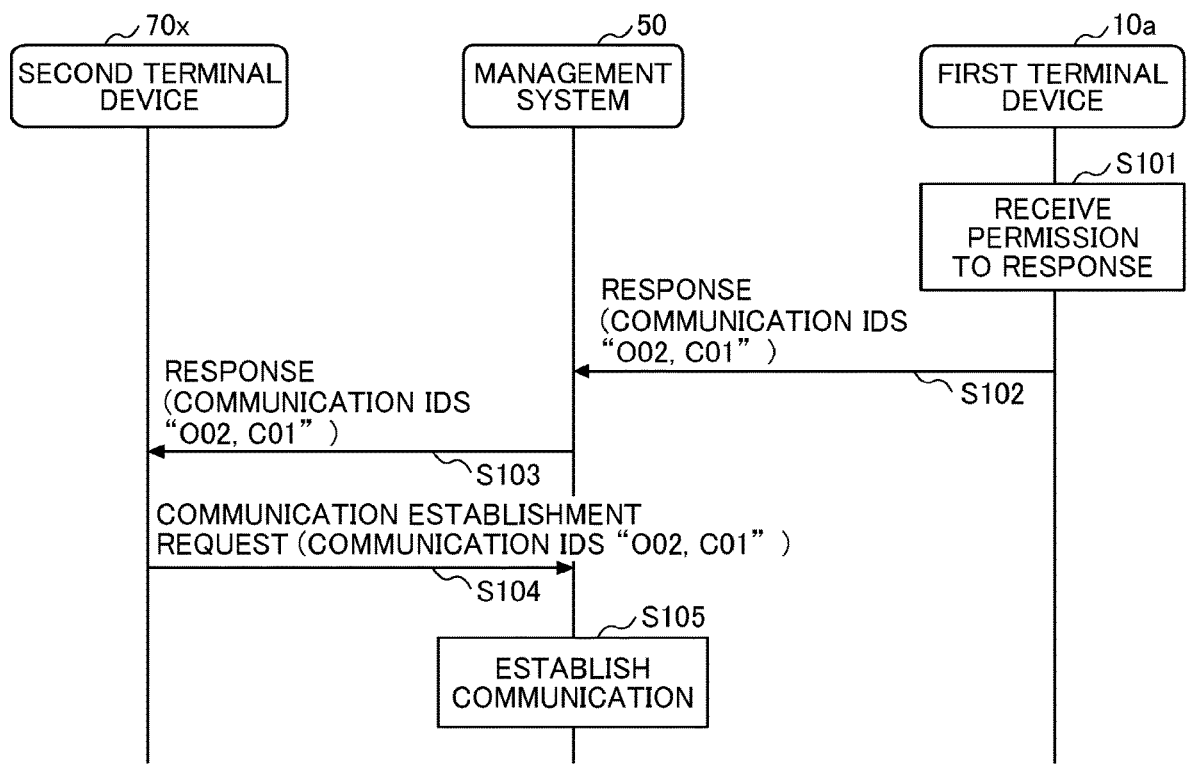
FIG. 16 is a sequence diagram illustrating an example of a process of establishing a communication between terminals, according to an embodiment.

A description is now given of a process of establishing a communication between the first terminal device 10 and the second terminal device 70, with reference to FIG. 16. FIG. 16 is a sequence diagram illustrating an example of a process of establishing a communication (online call) between the first terminal device 10 and the second terminal device 70, according to an embodiment of the present disclosure. A description is given below of an example case in which the first terminal device 10a responds to a call start request transmitted from the second terminal device 70x.

The communication unit 11 of the first terminal device 10a receives the call start request transmitted from the second terminal device 70x via the management system 50 (see S89-2). In response to the call start request, the display control unit 17 of the first terminal device 10a outputs to the display 720 a message including information on a request source corresponding to the communication ID "C01" included in the call start request, and the attribute "Hokkaido" corresponding to the information of attribute "hd" included in the call start request.

Figure 17:
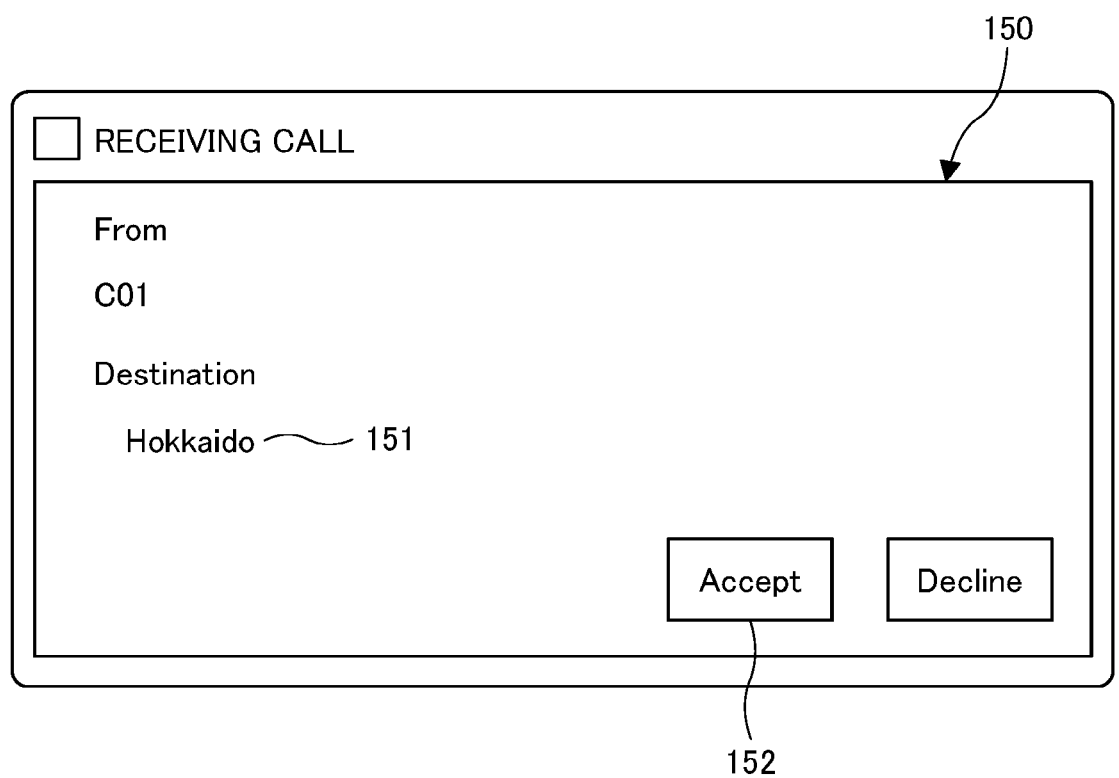
FIG. 17 is an illustration of an example of a displayed message, according to an embodiment.

FIG. 17 is an illustration of an example of a displayed message, according to an embodiment of the present disclosure. By a message 150 that includes an attribute 151, the operator, who is a user of the first terminal device 10, is able to prepare for explaining about a country or an area indicated by the attribute 151, before starting taking on a call.

The message illustrated in FIG. 17 includes a respond button 152 for accepting to start the call communication. When the user (operator) presses the respond button 152 on the screen of the first terminal device 10a, the operation input receiving unit 12 receives the user operation of inputting for permitting to respond to the call (step S101). In response to the operation of inputting for permitting to respond to the call, the communication unit 11 of the first terminal device 10a transmits to the management system 50 a response including the communication ID "C01" of the second terminal device 70*x*, which is a source of the call start request, and the communication ID "O01" of the own terminal 10*a* (step S102).

The communication unit 51 of the management system 50 receives the response from the first terminal device 10*a*. The communication unit 51 of the management system 50 transmits the received response to the second terminal device 70*x* identified by the communication ID "C01" included in the response (step S103).

In response to the response, the communication unit 71 of the second terminal device 70*x* transmits, to the management system 50, a call communication establishment request (communication establishment request) for establishing a communication (call) between the second terminal device 70*x* (own terminal) and the first terminal device 10*a*, which is a source of the response (step S104). The communication establishment request includes the communication ID "C01" of the second terminal device 70*x* (own terminal), and the communication ID "O01" of the first terminal device 10*a*, which is a source of the response.

The communication unit 51 of the management system 50 receives the communication establishment request. The session control unit 54 of the management system 50 establishes a session between the first terminal device 10*a* and the second terminal device 70*x*, which are respectively identified by the communication ID "O01" and the communication ID "C01" included in the communication establishment request, via the relay device 30. Through the established session, content data such as image data or voice data is to be transmitted between the first terminal device 10*a* and the second terminal device 70*x* via the relay device 30 (step S105). The session described above is an example and not limiting, and a session through which the content data is to be directly transmitted between the first terminal device 10*a* and the second terminal device 70*x* through the second communication network 2.

Once the communication is established between the first terminal device 10*a* and the second terminal device 70*x*, one of the first terminal device 10*a* and the second terminal device 70*x* transmits image data of an image captured by the own terminal and audio data of sound collected by the own terminal to the other one of the first terminal device 10*a* and the second terminal device 70*x* via the relay device 30. Each of the display control units 17 of the first terminal devices 10*a* and the display control units 77 of the second terminal device 70*x* outputs the received content data. Through this, the users start talking on the call.

Figure 18:
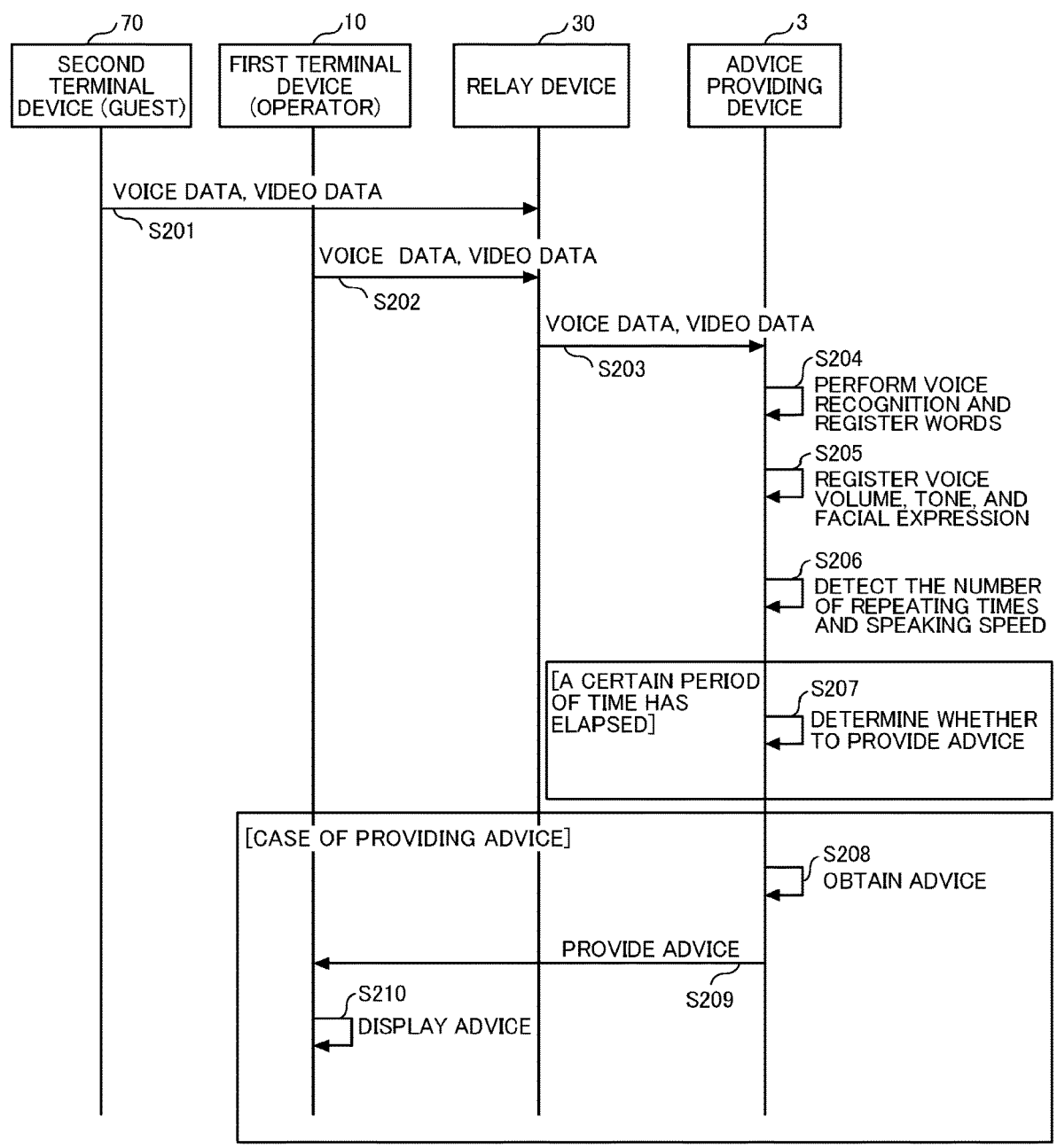
FIG. 18 is a sequence diagram illustrating an example of a process of providing advice on improving a speaking style, performed by an advice providing device, according to an embodiment.
Figure 19:
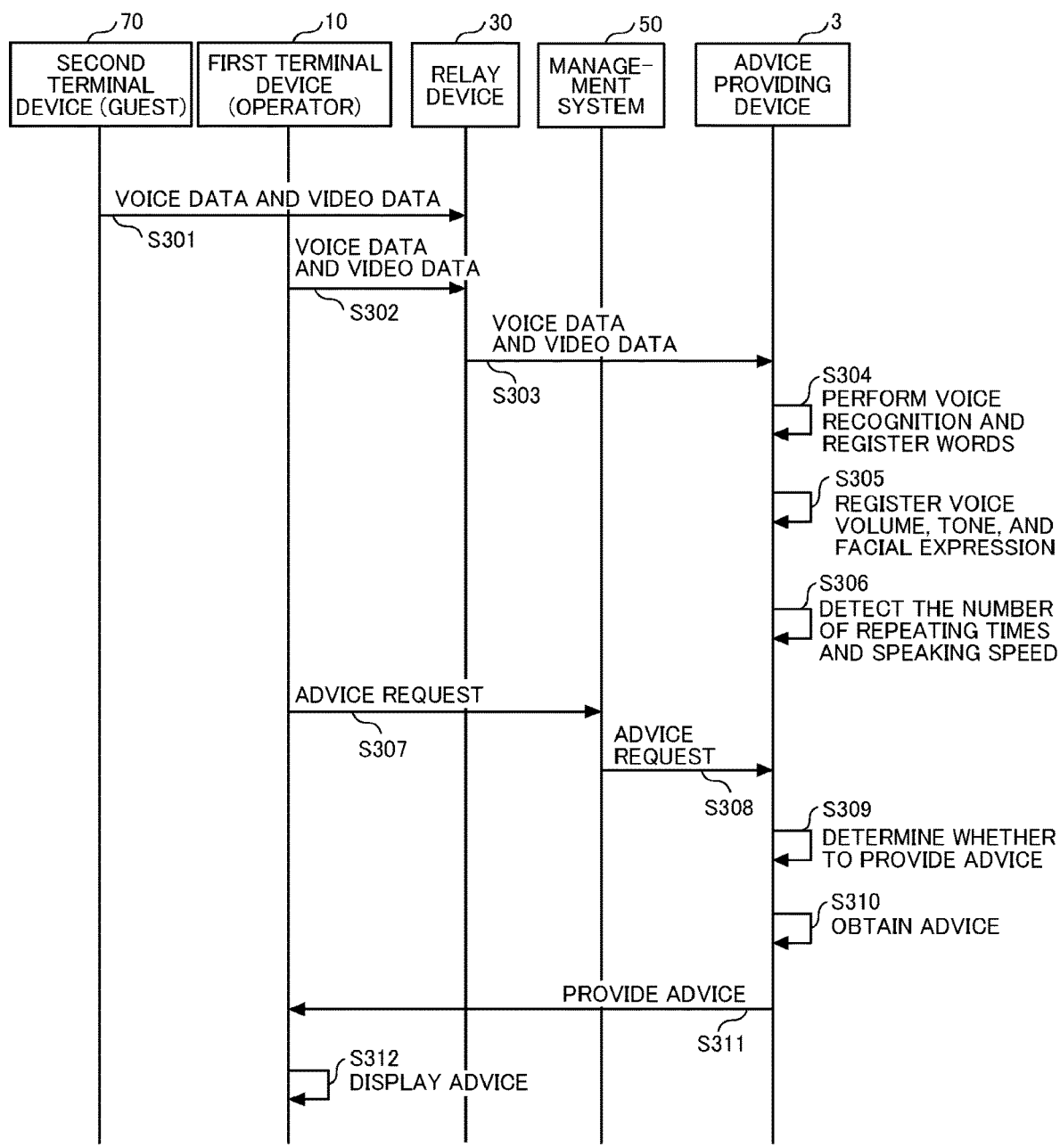
FIG. 19 is a sequence diagram illustrating an example of a process of providing advice in response to a request from an operator, performed by an advice providing device, according to an embodiment.

Process of Providing Advice:

A description is now given of a process of providing advice on improving a speaking style of an operator from the advice providing device 3 after establishing a communication, with reference to FIG. 18 and FIG. 19. FIG. 18 is a sequence diagram illustrating an example of a process of providing from the advice providing device 3 advice on improving a speaking style, according to an embodiment of the present disclosure. In FIG. 18, the advice is provided at constant intervals.

S201, S202: When a communication is established, the communication unit 11 of the first terminal device 10 and the communication unit 71 of the second terminal device 70 repeatedly transmit voice data and video data to the relay device 30.

S203: The relay device 30 receives the voice data and the video data and transfers the voice data and the video data to the advice providing device 3. In addition to the voice data and the video data, the communication ID is transmitted to the relay device 30 together with the voice data and the video data. By the communication ID, the relay device 30 determines which of the guest and the operator transmits the data.

S204: The communication unit 91 of the advice providing device 3 receives the voice data and the video data. The voice recognition unit 92 performs voice recognition on the voice data. The voice recognition unit 92 further performs morphological analysis, and registers words and parts of speech in the word storage unit 3001, in associated with each other.

S205: The volume recording unit 93 of the advice providing device 3 detects voice volume based on the amplitude of the voice data and registers the detected voice volume in association with the corresponding word. In addition, the tone determination unit 94 performs Fourier transform on the voice data to check a tone according to the frequency having the maximum intensity and registers the tone in association with the corresponding word. In addition, the video analysis unit 97 analyzes the video data to determine, for example, whether a facial expression is smiling or not, and registers the facial expression in association with the corresponding word.

S206: Further, the repeat detection unit 95 of the advice providing device 3 determines whether the previously registered character string is included in the list of words spoken by the guest to detect that the guest asked the operator to repeat what the operator said. When the guest asks the operator to repeat what the operator said, the number of repeating times in the the-number-of-repeating-times storage unit 3002 is updated (incremented by one). In addition, the speaking speed detection unit 96 detects each speaking speed of the operator and the guest based on the number of words (characters) per a certain period of time in the conversation and registers the detected speaking speed in the speaking speed storage unit 3003. The latest value may be registered, or alternatively, an average of speaking speed based on the data obtained in the past may be registered.

S207: The advice providing unit 98 determines whether to provide advice on improving the speaking style of the operator at constant intervals, which is described in detail later. For example, the advice providing unit 98 determines whether the number of repeating times exceeds a value of "the number of times" that is registered in the first advice information storage unit 3004. When determining that the number of repeating times exceeds "the number of times", which is registered in the first advice information storage unit 3004, the advice providing unit 98 determines to provide advice. In addition, the advice providing unit 98 determines whether a difference between the speaking speed of the operator and the reference value exceeds a value of the speed difference registered in the second advice information storage unit 3005, for example. When determining that the difference between the speaking speed of the operator and the reference value exceeds the value of the speed difference registered in the second advice information storage unit 3005, the advice providing unit 98 determines to provide advice. In addition, the advice providing unit 98 compares time elapsed from starting the communication, which is time taken for serving the guest, with the average service time stored in the time information storage unit 3006. When determining that the time elapsed exceeds the average service time stored in the time information storage unit 3006, the advice providing unit 98 determines to provide advice.

S208: When determining to provide the advice, the advice providing unit 98 of the advice providing device 3 obtains information on the advice and a display method from the first advice information storage unit 3004 or the second advice information storage unit 3005.

S209: The advice providing unit 98 transmits the advice and the display method to the first terminal device 10 being used by the operator.

Figure 20:
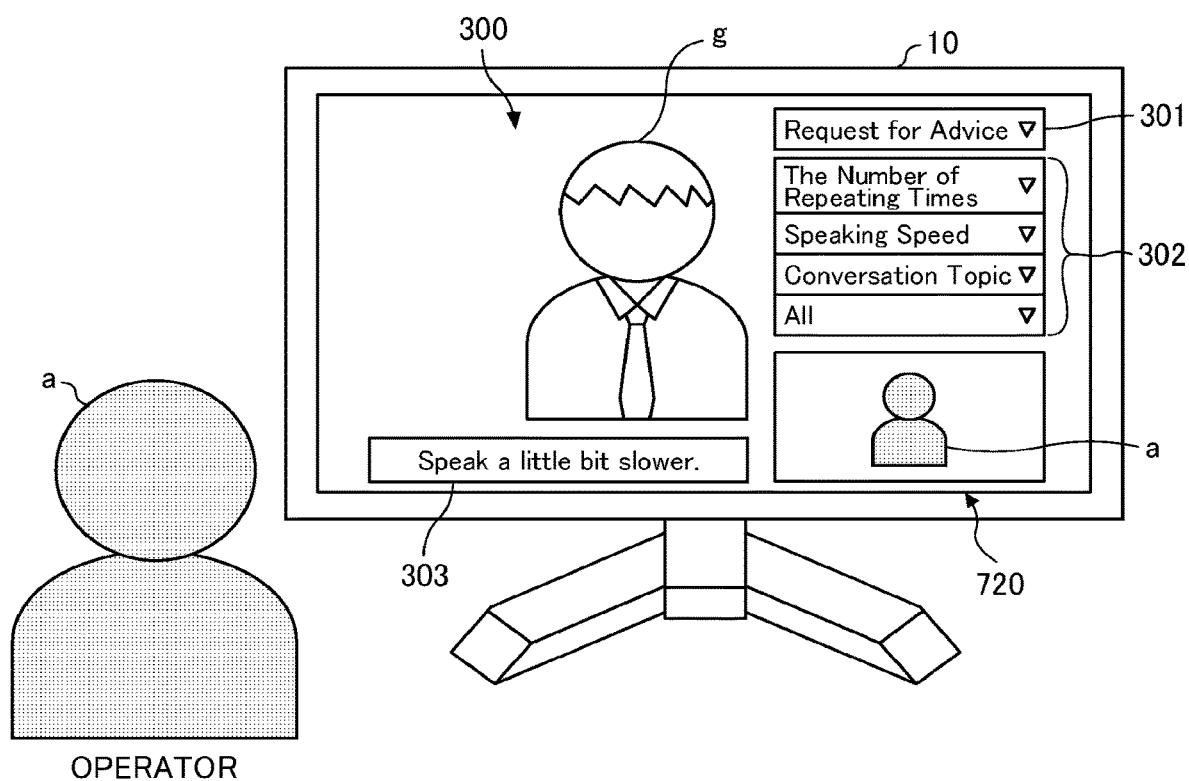
FIG. 20 is a diagram illustrating an example of a screen displayed on a terminal device of an operator during a call, according to an embodiment.

S210: The communication unit 11 of the first terminal device 10 of the operator receives the advice and the display method, and the display control unit 17 of the first terminal device 10 displays the advice on a screen being displayed during the current call. An example of the screen during a call is illustrated in FIG. 20.

As described above, the first terminal device 10 being used by the operator displays a method of improving the speaking style at constant intervals during the call, resulting in improving work efficiency in such the customer service.

FIG. 19 is a sequence diagram illustrating an example of a process of providing advice, from the advice providing device 3, in response to a request from an operator, according to an embodiment of the present disclosure.

S301-S306: The processing may be substantially the same manner as the processing of S201-S206 in the process illustrated in FIG. 18.

S307: The operator desires to know how to improve his or her speaking style and inputs a predetermined operation to the first terminal device 10. For example, the predetermine operation may be a user operation of pressing an advice request button, "Request for Advice", displayed on a screen of the first terminal device 10 being used by the operator during the current call. The operation input receiving unit 12 accepts the user operation, and the communication unit 11 transmits an advice request to the management system 50 with the communication ID. The advice request may be related to advice on the number of repeating times or advice on the speaking speed, however types of advice are not limited to these. The advice request also may be related to advice on a conversation topic, for example. The operator may request for advice by specifying what type of advice the operator desires. Alternatively, the operator may request for all types of advice gettable. In the example of FIG. 19, all types of advice gettable are requested.

S308: The communication unit 51 of the management system 50 receives the advice request and transfers the received advice request to the advice providing device 3.

S309: The advice providing unit 98 of the advice providing device 3 determines whether to provide advice based on the number of repeating times and the speaking speed. The determination method may be substantially the same manner as that in the example of FIG. 18. When determining not necessary to provide any advice, the advice providing unit 98 transmits a message indicating that there is no advice to be provided to the first terminal device 10. Regarding advice on a conversation topic, the advice providing unit 98 provides advice without determining whether to provide advice. More specifically, the advice providing unit 98 provides a word list including words or units of words in each of which the guest seemed to express his or her interest during the conversation by weighting each word or each unit of words, which is stored in word storage unit 3001, using at least one of the voice volume, the tone, and the facial expression. A detailed description is given below.

S310-S312: The advice providing device 3 transmits the advice, and the display control unit 17 of the first terminal device 10 of the operator displays the advice. The processing may be substantially the same manner as the processing of S208-S210 in the example of FIG. 18.

In addition to the advice related to the number of repeating times and the advice related to the speaking speed illustrated in FIG. 18 and FIG. 19, the advice providing unit 98 may provide a method of improving speaking speed based on the voice volume or tone. For example, when a value of the voice volume indicates under a threshold value, a piece of advice, "Speak up little bit" may be provided. In addition, for example, when a value of the tone is lower than a threshold value, a piece of advice, "Raise the tone of your voice" may be provided. In addition, for example, when the analysis of the facial expression performed based on the video data determines that there are few smiles on the operator face (under a threshold), a piece of advice "Talk with your customer with a slimily face".

Examples of Advice Displayed on Screen during Call:

FIG. 20 is a diagram illustrating an example of a screen 300 displayed on the first terminal device 10 being used by an operator during a call, according to an embodiment. The screen 300 displayed during a call may be, hereinafter, referred to as a call screen 300. The call screen 300 is a screen displayed during the call on the operator side, a video of the guest g is mainly displayed in large, and a video of the operator a is displayed at a lower right. The call screen 300 being displayed includes an advice request button 301, "Request for Advice", at the upper right. The advice request button 301 is a button for requesting, from the operator, a method for improving a speaking style at any time. When the advice request button 301 is pressed, request items 302 are displayed as pull down menus, which includes "The Number of Repeating Times", "Speaking Speed", "Conversation Topic", and "All", each of which is selectable.

When the advice providing device 3 transmits advice related to "The Number of Repeating Times" or "Speaking Speed", the call screen 300 includes the advice. The call screen 300 illustrated in FIG. 20 includes a piece of advice 303, "Speak a little bit slower", in a lower side. By seeing the advice 303 displayed on the screen 300, the operator may improve his or her speaking style during taking with his or her customer. The advice 303 may be displayed anywhere on the call screen 300. The advice 303 may be displayed as a pop-up screen or a pop-up image.

Figure 21A:
FIG. 21A to FIG. 21C are illustrations of examples of icons each of which indicate a piece of advice, according to an embodiment.
Figure 21B:
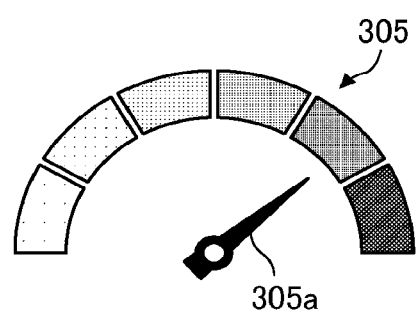
Figure 21C:

In alternative to text, the advice 303 may be displayed as an icon or image data. FIG. 21A to FIG. 21C are illustrations of examples of icons each of which indicates a piece of advice, according to an embodiment. FIG. 21A is an illustration of an icon 304 that indicates advice related to a speaking speed (conversation speed). For example, the icon 304 is constantly moving on the call screen 300 at a speed according to a conversation speed (the conversation speed is reported at constant intervals), and when the conversation speed exceeds a threshold value, the advice providing unit 98 notifies the operator of the speed by changing a color of the icon 304, for example. Alternatively, the icon 304 usually may not be displayed on the call screen 300, but when the conversation speed exceeds the threshold value, the advice providing unit 98 notifies the conversation speed and the first terminal device 10 of the operator may display the icon 304, which is moving at a speed according to the conversation speed.

FIG. 21B is an illustration of an icon 305 that also indicates advice related to a speaking speed (conversation speed). This icon 305 imitates a speedometer of a vehicle, and the icon 305 is usually displayed on the call screen 300. A needle 305a rotates clockwise to indicate the surrounding color as a conversation speed increases, so that the operator determines whether the conversation speed is appropriate by the color indicated by the needle 305a.

FIG. 21C is an illustration of an icon 306 that indicates a voice volume according to the number of repeating times.

The icon 306 imitates a volume meter, and the icon is usually displayed on the call screen 300. The louder the voice is, the longer the bar is, and the left side is displayed in a color that indicates high alert, such as red. That is, the bars are displayed in different colors from left to right. When the volume indicates under a certain level, the icon 306 is displayed in red, for example, and the operator determines that the voice is too soft when the bar is displayed in red, accordingly.

Figure 22:
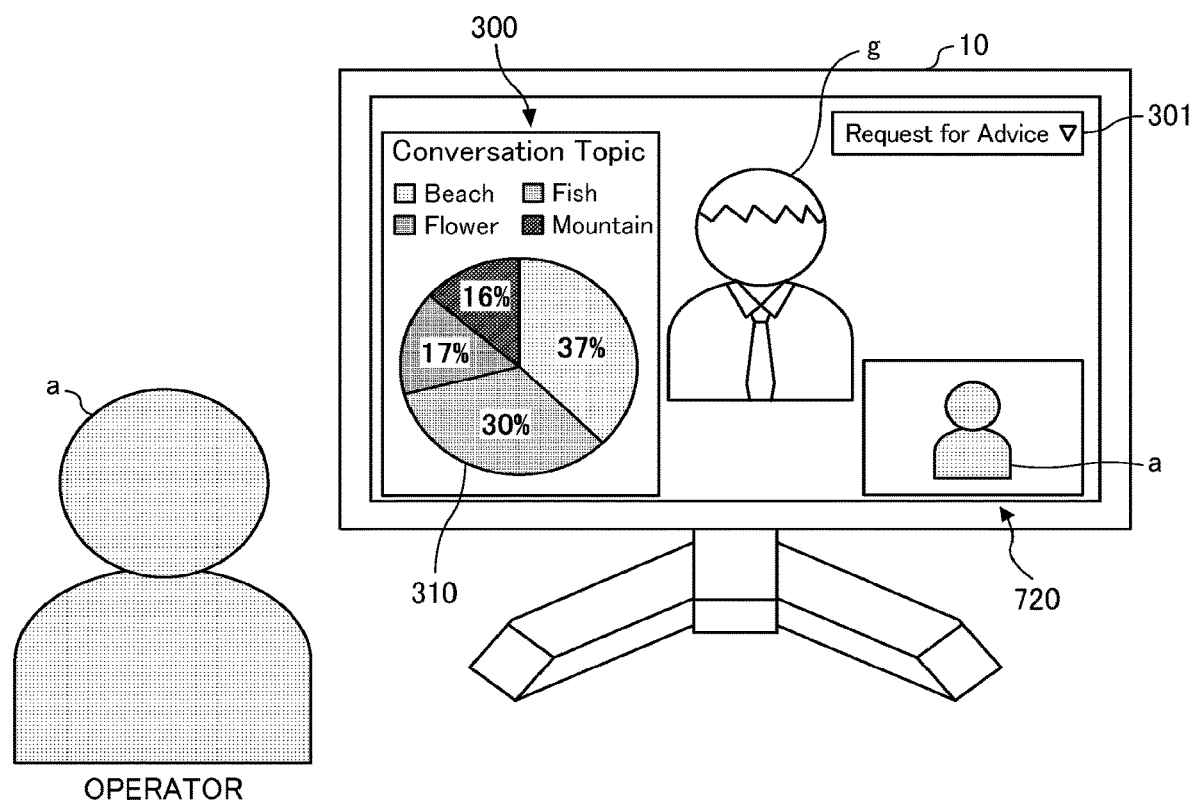
FIG. 22 is a diagram illustrating an example of a screen displaying example advice on a conversation topic, according to an embodiment.

FIG. 22 is a diagram illustrating an example of the call screen 300 displaying example advice on a conversation topic, according to an embodiment. In FIG. 22, a pie chart 310 is displayed by popping up on the call screen 300. The display method is an example, and the example advice may be displayed with another screen or may be displayed on a part of the call screen 300.

The conversation topic is, for example, a suggestion for theme of the conversation, provided, when the guest seems not to be sure which plan to choose, by the advice providing device 3 to the operator, with an appropriate word among from the words included in the past conversation. The operator may easily identify the word (theme) that the guest is interested in among from the words used in the conversation in which the guest talks in various manner.

In FIG. 22, scores calculated by weighting the words (nouns) registered in the word storage unit 3001 are displayed in percentage. The calculation method is described below. The advice providing unit 98 acquires, for example, a noun from the words stored in the word storage unit 3001. If there are two or more words that are synonyms each other, the two or more words may be regarded as the same noun (unit of words having the same meaning). For example, scuba diving and skin diving are regarded as the same noun (unit of words having the same meaning). Such processing is referred to as data cleansing. Data cleansing is to improve the data quality by searching for word(s) of duplicates, errors, and spelling inconsistencies in the data stored in a database, and then deleting, correcting, or normalizing the data.

Then, the voice volume, loud/medium/soft, the tone, high/low, and the facial expression, smile/normal, each of which is associated with the noun (unit of words), are weighted by being converted into coefficients α, β, and γ, respectively. The voice volume, loud/medium/soft, the tone, high/low, and the facial expression, smile/normal, correspond to αn (α1 to α3), βn (β1, β2), and γn (γ1, γ2), respectively.

Accordingly, a score of each noun (unit of words having the same meaning) is calculated as follows.

$$Score = \Sigma(\alpha n \times \beta n \times \gamma n)$$

Σ represents adding for the same noun.

The advice providing unit 98 calculates a ratio by summing the scores of a noun having a score equal to or higher than a threshold value (that is, deleting a noun that is used merely one time) and dividing the score of each noun by the total value obtained by summing. Ratio of noun=score of noun/total value of noun A pie chart as illustrated in FIG. 22 is generated based on the ratio of nouns.

In addition, relation between a word of noun and a word of adjective, adjective verb, or auxiliary verb may be detected and weighted. For example, when the guest says, "a beautiful beach", the guest positively uses "beach". On the other hand, when the guest says, "the beach is dirty", the guest negatively uses "beach". Accordingly, the score of the noun is incremented when an adjective that has positive meaning is detected, and the score of the noun is decremented when an adjective that has negative meaning is detected. The same applies to adjective verb. In a case of "I want to go to the beach" and "I do not want to go to the beach", the former is a positive statement, but the latter having "not" is a negative statement. Accordingly, the score is incremented or decremented in substantially the same as or a similar manner to described above. The same applies to auxiliary verb.

Detailed Description of Operation of Advice Providing Device

Figure 23:
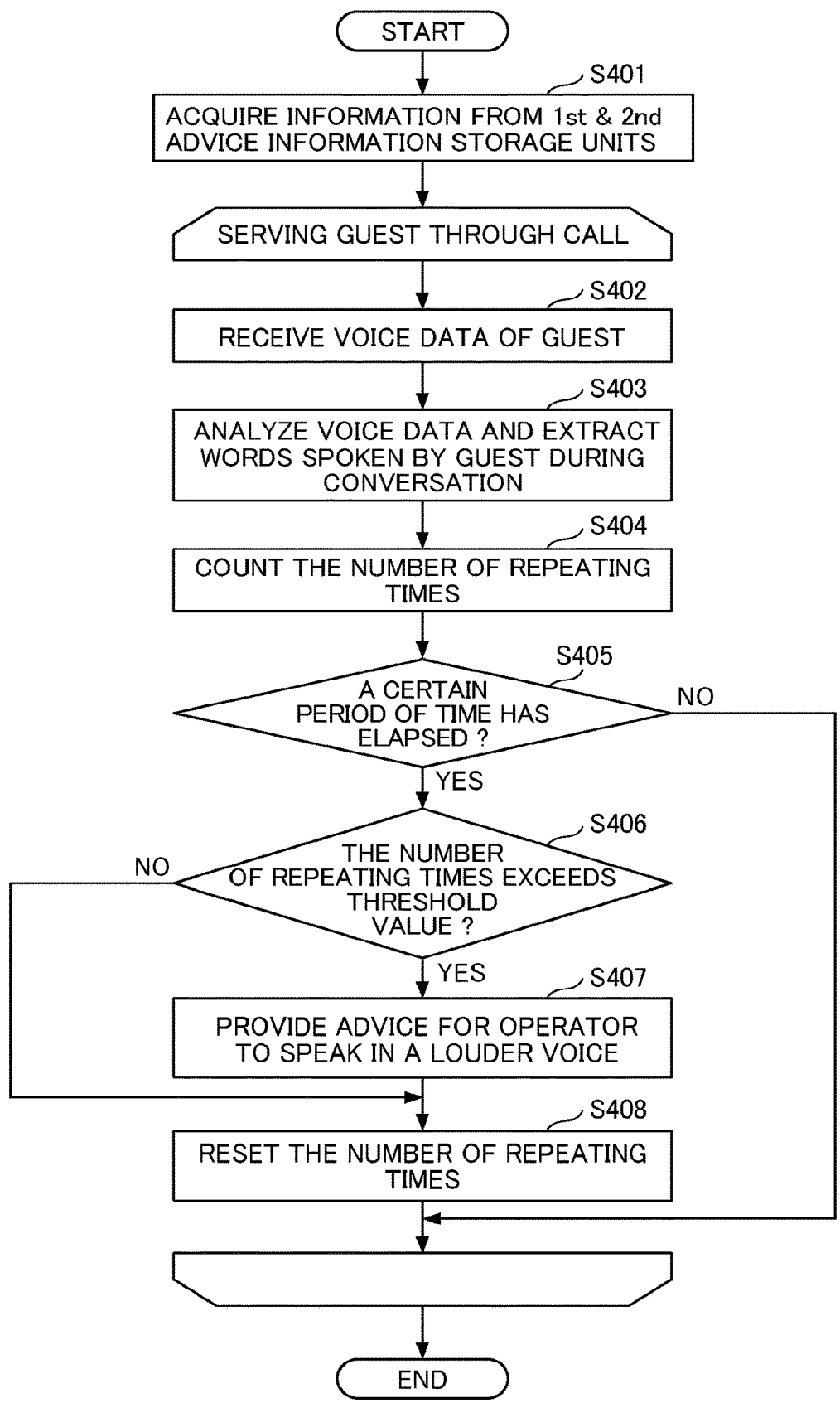
FIG. 23 is a flowchart illustrating an example of a process in a case where an advice providing device prompts an operator to speak louder, according to an embodiment.

FIG. 23 is a flowchart illustrating an example of a process in a case where the advice providing device 3 prompts the operator to speak in a louder voice, which is louder than a current voice of the operator, according to an embodiment. The process illustrated in FIG. 23 starts when a communication (call) starts, for example.

First, the advice providing unit 98 acquires the information stored in the first advice information storage unit 3004, the second advice information storage unit 3005, and the time information storage unit 3006 (step S401).

The communication unit 91 of the advice providing device 3 receives the voice data and the video data (step S402). The voice recognition unit 92 analyzes the voice data and the video data and registers a word or the like in the word storage unit 3001 (step S403).

The repeat detection unit 95 determines whether the guest asks the operator to repeat what the operator said. When determining that the guest asks so, the repeat detection unit 95 updates the number of the repeating times in the the-number-of-repeating-times storage unit 3002 (step S404).

The advice providing unit 98 determines whether a certain time has elapsed (step S405). The certain time may be set by a user or designer in advance. Each time when the certain time has elapsed, the advice providing unit 98 determines whether the number of repeating times stored in the-number-of-repeating-times storage unit 3002 exceeds the number of times (threshold value) of the first advice information storage unit 3004 (step S406). Note that in addition to each time when the certain time has passed, the above step is performed when the operator requests.

When the determination in S406 is Yes, the advice providing unit 98 transmits, to the first terminal device 10, advice indicating to prompt the operator to speak up, or speak in a louder voice (step S407).

The advice providing unit 98 resets the number of repeating times stored in the the-number-of-repeating-times storage unit 3002 (step S408). Resetting means returning the value of the number of repeating times to zero.

As described above, the advice providing unit 98 may provide the operator with the advice that suggest operator to speak in a louder voice at constant intervals or when the operator requests.

Figure 24:
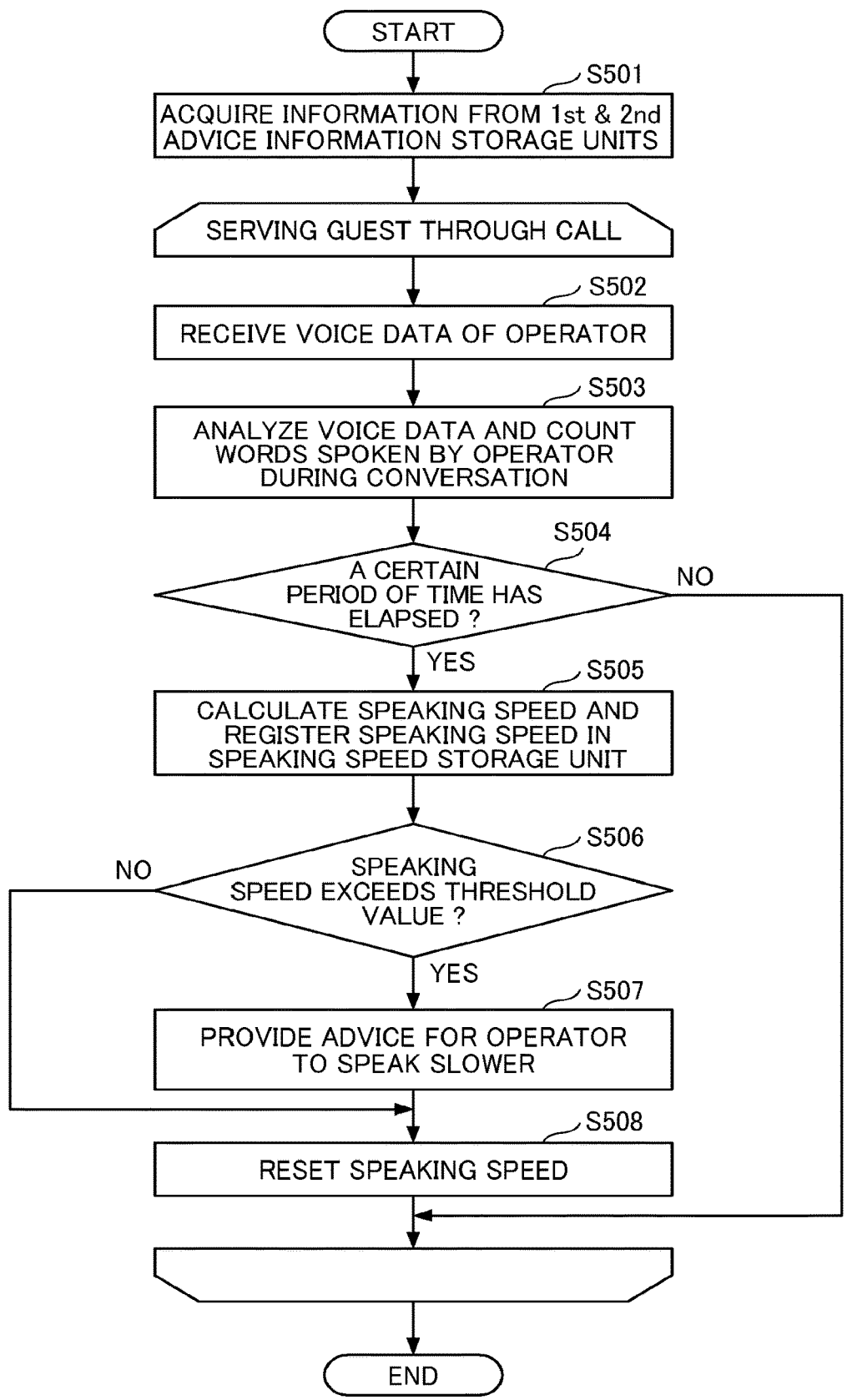
FIG. 24 is a flowchart illustrating an example of a process in a case where an advice providing device prompts an operator to speak slower, according to an embodiment.

FIG. 24 is a flowchart illustrating an example of a process in a case where the advice providing device 3 prompts the operator to speak slower, according to an embodiment. The process illustrated in FIG. 24 starts when a communication (call) starts, for example.

First, the advice providing unit 98 acquires the information stored in the first advice information storage unit 3004, the second advice information storage unit 3005, and the time information storage unit 3006 (step S501).

The communication unit 91 of the advice providing device 3 receives the voice data and the video data (step S502). The voice recognition unit 92 analyzes the voice data and the video data and registers a word or the like in the word storage unit 3001.

The speaking speed detection unit 96 counts the number of words (characters) spoken by the operator (step S503). The number of characters is the number of syllables before a word is converted to Chinese character in a case where the language being used is Japanese.

The speaking speed detection unit 96 determines whether a certain time has elapsed (step S504). The certain time may be set by a user or designer in advance. Each time when a certain period of time has elapsed, the speaking speed detection unit 96 calculates a speaking speed by dividing the number of characters spoken by the guest by the certain period of time (step S505). The speaking speed is registered in the speaking speed storage unit 3003. The speaking speed is also calculated when requested by the operator. When the operator requests for the speaking speed, the speaking speed detection unit 96 calculates the speaking speed using a period of time from the start of counting the number of characters to the reception of the request from the operator, instead of the certain period.

The advice providing unit 98 determines whether the difference between the speaking speed and the reference value exceeds the speed difference (threshold value) stored in the second advice information storage unit 3005 (S506).

When the determination in S506 is Yes, the advice providing unit 98 transmits, to the first terminal device 10, advice to slow down the current speaking speed of the operator (S507).

The advice providing unit 98 resets the speaking speed stored in the speaking speed storage unit 3003 (S508). Resetting means returning the value of the speaking speed to zero.

As described above, the advice providing unit 98 may provide the operator with the advice that suggest operator to speak slower at constant intervals or when the operator requests.

In one or both the examples of FIG. 23 and FIG. 24, whether the elapsed time from the start of the call exceeds the average service time may be determined, and accordingly advice to shorten the call time may be provided. Instead of comparing with the average service time itself, in a case of average customer service time×0.8<call time, average service time×1.2<call time, etc., the advice may be provided. Accordingly, the operator serves the guest while taking the call time in consideration.

Figure 25:
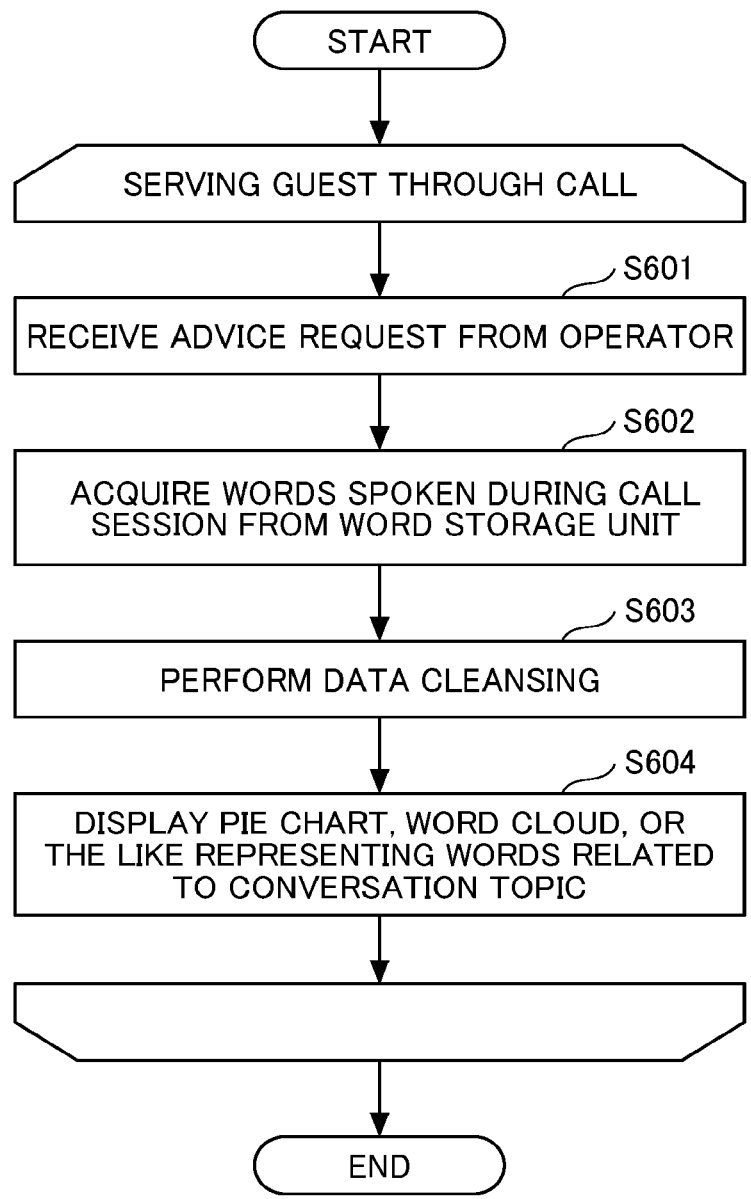
FIG. 25 is a flowchart illustrating an example of a process in a case where an advice providing device provides an operator with advice on a conversation topic, according to an embodiment.

FIG. 25 is a flowchart illustrating an example of a process in a case where the advice providing device 3 provides the operator with advice on a conversation topic, according to an embodiment. The process illustrated in FIG. 25 starts when a request for advice is received from the operator.

First, the communication unit 91 of the advice providing device 3 receives a request for advice (advice request) from the first terminal device 10 being used by the operator (step S601).

The advice providing unit 98 acquires all the words, the voice volume, the tone, and the facial expression recorded during the call from the word storage unit 3001 (step S602).

Next, the advice providing unit 98 performs data cleansing on the acquired data (step S603). The advice providing unit 98 converts the word after data cleansing into a score. The nouns (words), which may be the conversation topics, are represented as visual information such as a pie chart by processing the data and transmitted to the first terminal device 10 being used by the operator (step S604). Thereby, the pie chart 310 or the like is displayable on the first terminal device 10 being used by the operator. In alternative to a pie chart, a bar chart or a word cloud may be used. The word cloud is a method in which text data is divided into words and each extracted word is illustrated in a size corresponding to the appearance frequency (score) in the text.

As described above, when the operator requests for advice, the advice providing unit 98 provides the conversation topics, so that the operator leads the conversation to a topic in which the guest is interested, resulting in improving the customer service efficiency.

As described above, the communication system according to the present embodiment provides advice based on an analysis result of the voice data as a specific improvement method, resulting in improving the work efficiency in such as customer service.

In addition, since the conversation topics are displayed, the operator may lead the conversation to a topic in which the guest is interested, resulting in improving the work efficiency in the customer service.

Other Example Embodiments for Application

The above-described embodiments are illustrative and do not limit the present disclosure. Thus, numerous additional modifications and variations are possible in light of the above teachings within the scope of the present disclosure. Any one of the above-described operations may be performed in various other ways, for example, in an order different from the one described above.

For example, in the present embodiment described above, a method for improving work efficiency in a customer service of a travel agency is described as an example, however the disclosure may be suitably applied to other industries. For example, such industries may include financial industry, health consultation, medical consultation, and the like.

In addition, the disclosure may be applied to a reception of a local government, such as a city hall. For example, a staff may serve customers for each task (residence certificate, family register, tax payment, oversized garbage, pension, etc.).

In addition, the management system 50 may have the function of the relay device 30, or the relay device 30 may have the function of the management system 50. In addition, the functions of the management system 50 may be implemented by a plurality of servers, or a plurality of management systems 50 may be used.

In addition, the functional configurations illustrated in FIG. 6 and FIG. 8 are each divided into blocks according to main functions, in order to facilitate understanding the processes performed by the management system 50, the first terminal device 10 and the second terminal device 70. No limitation is intended by how the processes are divided or by the name of the processes. The processes implemented by the management system 50, the first terminal device 10, and the second terminal device 70 may be divided into a larger number of processes according to the contents of processes. Further, the processing unit may be divided so that one processing unit includes more processing.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), and field programmable gate array (FPGA), and conventional circuit components arranged to perform the recited functions.

In an embodiment, the management system 50, the relay device 30, or the advice providing device 3 includes plural computing devices, such as a server cluster. The multiple computing devices are configured to communicate with one another through any type of communication link, including a network, a shared memory, etc., and perform processes disclosed herein. In substantially the same manner, the first terminal device 10 and the second terminal device 70 may include multiple computing devices configured to communicate with one another.

Further, the management system 50, the relay device 30, or the advice providing device 3 may be configured to share the disclosed processing steps in various combinations. For example, a part of the process performed by the management system 50, the relay device 30, or the advice providing device 3 may be performed by the first terminal device 10 or the second terminal device 70. For example, a part of the process performed by the first terminal device 10 or the second terminal device 70 may be performed by the management system, the relay device, or the advice providing device.

With a method, which is conventionally used, for displaying an analysis result of conversation, work efficiency in various department using the communication system may not be improved in an efficient way. For example, if the analysis result of the conversation is simply displayed as a numerical value, some amount of time is required for an operator to understand how the operator uses the analysis result for improving his or her work efficiency in a customer service.

According to the embodiment described above, the communication system assists a user in improving work efficiency when serving a customer.

Any one of the above-described operations may be performed in various other ways, for example, in an order different from the one described above.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A communication system, comprising:
a first terminal device operated by an operator;
a second terminal device operated by a guest, the second terminal device configured to communicate with the first terminal device through a network; and
an advice providing device, the advice providing device comprising circuitry configured to
analyze first voice data that is related to the operator and transmitted from the first terminal device;
analyze second voice data that is related to the guest and transmitted from the second terminal device;
determine, based on analysis of the first voice data and the second voice data, advice for the operator to improve a speaking style of the operator; and
transmit the advice to the first terminal device, wherein the first terminal device is configured to receive the advice, and display the advice on a display.

2. The communication system according to claim 1, wherein the first terminal device includes:
interface circuitry configured to communicate with the second terminal device and the advice providing device; and
the display.

3. The communication system according to claim 1, wherein to analyze the second voice data, the circuitry detects a number of times that the guest asked the operator to repeat what the operator said.

4. The communication system according to claim 1, wherein to analyze the first voice data, the circuitry detects a speaking speed of the operator.

5. The communication system according to claim 4, wherein the advice is to slow down the speaking speed.

6. The communication system according to claim 1, wherein the advice indicates to speak in a louder voice, which is louder than a current voice of the operator.

7. The communication system according to claim 1, wherein
the first terminal device is further configured to
display, on the display, a button for accepting user operation of inputting an advice request, the inputting being performed by the operator, and
transmit, in response to acceptance of the user operation, the advice request to the advice providing device, and
the circuitry determines the advice according to the advice request.

8. The communication system according to claim 7, wherein
the circuitry is further configured to
store, in a memory, words represented by the second voice data as a word list, after performing voice recognition on the second voice data transmitted from the second terminal device,
generate, according to the advice request, visual information based on the word list, and
transmit the visual information to the first terminal device, and
the first terminal device displays the visual information on the display.

9. The communication system according to claim 8, wherein
the circuitry is further configured to
receive video data representing a video image including an image of the guest, the video data being received from the second terminal device,
store, in the memory, a facial expression of the guest in association with each of the words based on analysis of the video data, and
weight, based on the word list, each of the words with the facial expression to generate the visual information according to the advice request, and
the first terminal device displays the visual information on the display.

10. A non-transitory recording medium storing a plurality of instructions which, when executed by one or more processors, cause the one or more processors to perform a method comprising:
communicating with a terminal device operated by a guest via a system through a network;
transmitting, via the system, voice data of an operator to the terminal device;
receiving advice, determined by the system based on analysis of the voice data of the operator and analysis of guest voice data of the guest, for improving a speaking style of the operator; and displaying, on a display, the advice received for the operator.

11. A communication method, comprising:

communicating with a terminal device operated by a guest via a system through a network;

transmitting, via the system, voice data of an operator to the terminal device;

receiving advice, determined by the system based on analysis of the voice data of the operator and analysis of guest voice data of the guest, for improving a speaking style of the operator; and displaying, on a display, the advice received for the operator.

* * * * *